United States Patent
Sallas

(10) Patent No.: US 8,724,428 B1
(45) Date of Patent: May 13, 2014

(54) PROCESS FOR SEPARATING DATA RECORDED DURING A CONTINUOUS DATA ACQUISITION SEISMIC SURVEY

(71) Applicant: John Sallas, Plano, TX (US)

(72) Inventor: John Sallas, Plano, TX (US)

(73) Assignee: CGGVeritas Services SA, Massy Cedex (FR)

( * ) Notice: Subject to any disclaimer, the term of this patent is extended or adjusted under 35 U.S.C. 154(b) by 0 days.

(21) Appl. No.: 13/677,713

(22) Filed: Nov. 15, 2012

(51) Int. Cl.
*G01V 1/00* (2006.01)

(52) U.S. Cl.
CPC .......... *G01V 1/00* (2013.01); *G01V 2210/1214* (2013.01)
USPC .............................................. 367/38; 367/42

(58) Field of Classification Search
USPC ...................................................... 367/38–42
See application file for complete search history.

(56) References Cited

U.S. PATENT DOCUMENTS

| | | | |
|---|---|---|---|
| 3,288,243 A | 11/1966 | Silverman |
| 3,331,050 A | 7/1967 | Kilmer et al. |
| 3,691,516 A | 9/1972 | Graham et al. |
| 3,885,225 A | 5/1975 | Anstey et al. |
| 4,030,063 A | 6/1977 | Wallen |
| 4,069,470 A | 1/1978 | Cunningham et al. |
| 4,159,463 A | 6/1979 | Silverman |
| 4,168,485 A | 9/1979 | Payton et al. |
| 4,188,610 A | 2/1980 | Nelson |
| 4,272,226 A | 6/1981 | Osborne |
| 4,295,213 A | 10/1981 | Mifsud |
| 4,353,120 A | 10/1982 | Pickens |
| 4,391,299 A | 7/1983 | Holmes |
| 4,441,174 A | 4/1984 | Ray et al. |
| 4,514,834 A | 4/1985 | Hanson et al. |
| 4,556,963 A | 12/1985 | Hugus et al. |
| 4,636,956 A | 1/1987 | Vannier et al. |
| 4,715,020 A | 12/1987 | Landrum, Jr. |
| 4,799,201 A | 1/1989 | Nelson |
| 4,823,326 A | 4/1989 | Ward |

(Continued)

FOREIGN PATENT DOCUMENTS

| | | |
|---|---|---|
| EP | 2 267 486 A2 | 12/2010 |
| GB | 2 183 834 A | 6/1987 |

(Continued)

OTHER PUBLICATIONS

Written Opinion of the International Searching Authority in corresponding International Application No. PCT/EP2012/067998 mailed Oct. 17, 2012.

(Continued)

*Primary Examiner* — Krystine Breier
(74) *Attorney, Agent, or Firm* — Patent Portfolio Builders PLLC

(57) ABSTRACT

Method for separating signals recorded by a seismic receiver and generated with at least two vibratory seismic sources driven with no listening time. The method includes receiving seismic data that includes data d recorded by the seismic receiver and data related to the first and second vibratory seismic sources; computing a source separation matrix based on the data related to the first and second vibratory seismic sources; calculating first and second earth impulse responses HA and HB corresponding to the two vibratory seismic sources, respectively, based on the data d recorded by the seismic receiver, the data related to the two vibratory seismic sources and the source separation matrix; and separating the signals recorded by the seismic receiver based on the first and second earth impulse responses HA and HB such that signals the two vibratory seismic sources are disentangled.

20 Claims, 24 Drawing Sheets

(56) References Cited

U.S. PATENT DOCUMENTS

| | | | |
|---|---|---|---|
| 4,885,726 | A | 12/1989 | Myers |
| 4,953,657 | A | 9/1990 | Edington |
| 4,969,129 | A | 11/1990 | Currie |
| 4,982,374 | A | 1/1991 | Edington et al. |
| 5,062,089 | A | 10/1991 | Willard et al. |
| 5,128,900 | A | 7/1992 | Cole |
| 5,199,005 | A | 3/1993 | Forsberg |
| 5,410,517 | A | 4/1995 | Andersen |
| 5,426,618 | A | 6/1995 | Chen et al. |
| 5,703,833 | A | 12/1997 | Allen |
| 5,719,821 | A * | 2/1998 | Sallas et al. ............ 367/41 |
| 5,721,710 | A | 2/1998 | Sallas et al. |
| 5,901,112 | A | 5/1999 | Walker |
| 5,959,939 | A | 9/1999 | Tengham et al. |
| 6,028,818 | A | 2/2000 | Jeffryes |
| 6,049,507 | A | 4/2000 | Allen |
| 6,076,629 | A | 6/2000 | Tengham |
| 6,076,630 | A | 6/2000 | Ambs |
| 6,161,076 | A | 12/2000 | Barr et al. |
| 6,181,646 | B1 | 1/2001 | Bouroucos et al. |
| 6,253,156 | B1 | 6/2001 | Bui-Tran et al. |
| 6,327,537 | B1 | 12/2001 | Ikelle |
| 6,366,857 | B1 | 4/2002 | Bird et al. |
| 6,370,477 | B1 | 4/2002 | Vermeer |
| 6,464,035 | B1 | 10/2002 | Chelminski |
| 6,545,944 | B2 | 4/2003 | de Kok |
| 6,597,632 | B2 | 7/2003 | Khan |
| 6,606,958 | B1 | 8/2003 | Bouyoucos |
| 6,664,788 | B2 | 12/2003 | Hornbostel et al. |
| 6,687,619 | B2 | 2/2004 | Moerig et al. |
| 6,704,245 | B2 | 3/2004 | Becquey |
| 6,714,867 | B2 | 3/2004 | Meunier |
| 6,754,590 | B1 | 6/2004 | Moldoveanu |
| 6,766,256 | B2 | 7/2004 | Jeffryes |
| 6,807,508 | B2 | 10/2004 | Becquey |
| 6,842,701 | B2 | 1/2005 | Moerig et al. |
| 6,942,059 | B2 | 9/2005 | Smith |
| 7,257,049 | B1 | 8/2007 | Laws et al. |
| 7,327,633 | B2 | 2/2008 | Bagaini et al. |
| 7,515,505 | B2 * | 4/2009 | Krohn et al. ............ 367/49 |
| 7,551,518 | B1 | 6/2009 | Tenghamn |
| 7,859,945 | B2 * | 12/2010 | Sallas et al. ............ 367/190 |
| 7,881,160 | B2 | 2/2011 | Rouquette |
| 7,974,152 | B2 | 7/2011 | Tenghamn |
| 8,271,173 | B2 | 9/2012 | Wilmanowicz et al. |
| 8,339,896 | B2 * | 12/2012 | Van Borselen et al. ....... 367/24 |
| 2003/0176974 | A1 | 9/2003 | Baliguet et al. |
| 2004/0089499 | A1 | 5/2004 | Smith |
| 2007/0133354 | A1 | 6/2007 | Bagaini et al. |
| 2009/0251994 | A1 | 10/2009 | Rouquette |
| 2010/0118647 | A1 | 5/2010 | Tenghamn |
| 2010/0232260 | A1 | 9/2010 | Zowarka et al. |
| 2011/0038225 | A1 | 2/2011 | Tenghamn |
| 2011/0085416 | A1 | 4/2011 | Sallas |
| 2011/0085422 | A1 | 4/2011 | Thompson et al. |
| 2011/0128818 | A1 | 6/2011 | Eick et al. |
| 2011/0162906 | A1 | 7/2011 | Harper et al. |
| 2011/0317515 | A1 | 12/2011 | Tenghamn |
| 2012/0188845 | A1 | 7/2012 | Jeffryes |
| 2012/0314536 | A1 | 12/2012 | Bagaini |

FOREIGN PATENT DOCUMENTS

| | | |
|---|---|---|
| GB | 2259141 A | 3/1993 |
| GB | 2 280 032 A | 1/1995 |
| GB | 2 306 219 A | 4/1997 |
| WO | 86/03015 | 5/1986 |
| WO | 01/16621 A1 | 3/2001 |
| WO | 2009/077762 A2 | 6/2009 |
| WO | 2012/123883 A2 | 9/2012 |
| WO | 2012170608 A2 | 12/2012 |

OTHER PUBLICATIONS

International Search Report in corresponding International Application No. PCT/EP2012/067998 mailed Oct. 17, 2012.

William H. Dragoset, "Marine Vibrators and the Doppler Effect". Geophysics, vol. 53., No. 11, Nov. 1989, pp. 1388-1398.

Gary Hampson et al., "Effects of Source and Receiver Motion on Seismic Data", Geophysical Prospecting vol. 43, Issue 2, Feb. 1995, pp. 221-244.

J.E. Martin et al., Abstract of "Simultaneous Vibroseis Recording", Geophysical Prospecting, vol. 41, Apr. 1993.

Choon Byong Park et al., "Swept Impact Seismic Technique (SIST)", Geophysics, vol. 61, No. 6, Nov.-Dec. 1996, pp. 1789-1803.

William C. Pritchett, "An Example of Simultaneous Recording Where Necessary Signal Separation is Easily Achieved", Geophysics, vol. 56, No. 1, Jan. 1991 pp. 9-17.

E. Rietsch, "Vibroseis Signals With Prescribed Power Spectrum", Geophysical Prospecting, vol. 25, Issue 4, Dec. 1977, pp. 614-620.

Abd El-Aziz Khairy Abd El-Aal, "Harmonic by Harmonic Removal Technique for Improving Vibroseis Data Quality", Geophysical Prospecting, vol. 59, Issue 2, Mar. 2011, pp. 279-294.

E. Rietsch, "Computerized Analysis of Vibroseis Signal Similarity", Geophysical Prospecting, vol. 25, Issue 3, Sep. 1977, pp. 541-552.

Ulrich Polom, "Elimination of source-genrated noise from correlated vibroseis data (the 'ghost-seep' problem)", Geophysical Prospecting, vol. 45, Issue 4, Jul. 1997, pp. 571-591.

Great Britain Search Report in corresponding Great Britain Application No. 1215264.1 dated Dec. 5, 2012.

Great Britain Search Report in corresponding Great Britain Application No. 1215276.5 dated Dec. 21, 2012.

Danish First Technical Examination mailed Jun. 10, 2013 with Search Report in related Application No. PA 2012 70507.

US Office Action mailed May 29, 2013, in related U.S. Appl. No. 13/415,216.

US Office Action mailed on Apr. 8, 2013, in related U.S. Appl. No. 13/677,661.

US Office Action mailed on May 9, 2013, in related U.S. Appl. No. 13/687,028.

US Office Action mailed on Mar. 7, 2013, in related U.S. Appl. No. 13/687,059.

US Office Action mailed on Apr. 15, 2013, in related U.S. Appl. No. 13/687,084.

Danish First Technical Examination mailed Jun. 4, 2013 with Search Report in related Application No. PA 2012 70503.

International Search Report in related International Application No. PCT/EP2012/067999, mailed Aug. 9, 2013 (US 2009/0251994 issued as USP 7,881,160).

Written Opinion in related International Application No. PCT/EP2012/067999, mailed Aug. 9, 2013.

US Office Action mailed Sep. 30, 2013, in related U.S. Appl. No. 13/687,028.

* cited by examiner

PROCESS FOR SEPARATING DATA RECORDED DURING A CONTINUOUS DATA ACQUISITION SEISMIC SURVEY

BACKGROUND

1. Technical Field

Embodiments of the subject matter disclosed herein generally relate to methods and systems and, more particularly, to mechanisms and techniques for separating seismic data recorded during a continuous data acquisition seismic survey.

2. Discussion of the Background

Reflection seismology is a method of geophysical exploration to determine the properties of a portion of a subsurface layer in the earth, which is information especially helpful in the oil and gas industry. Marine reflection seismology is based on the use of a controlled source that sends energy waves into the earth. By measuring the time it takes for the reflections to come back to plural receivers, it is possible to estimate the depth and/or composition of the features causing such reflections. These features may be associated with subterranean hydrocarbon deposits.

For marine applications, sources in common use are essentially impulsive (e.g., compressed air is suddenly allowed to expand). One of the most used sources is airguns. An airgun produces a high amount of acoustics energy over a short time. Such a source is towed by a vessel at a certain depth along direction X. The acoustic waves from the airgun propagate in all directions. The airgun instantaneously releases large peak acoustic pressures and energy. Such a source is illustrated in FIG. 1. This figure shows a source array 104 being towed behind a vessel 101 at a shallow depth. When the source array is activated, acoustic energy is coupled into the water and transmitted into the earth, where part of the energy is partially reflected back from the ocean bottom 113 and from rock formation interfaces 112 (rock layer that has a change in acoustic impedance). Sensors or receivers 106 used to record the reflected energy include hydrophones, geophones and/or accelerometers. The receivers can be encapsulated in either fluid filled or solid streamers 105 that are also towed by vessels at shallow depth.

Currently, it is typical for one vessel to tow multiple streamers with diverters employed to ensure streamer separation by a fixed distance. In order to maintain the proper spacing between the streamers and sources, the vessel moves forward continuously, typically at a rate of about 4 knots (2 m/s). In some cases, the streamer can be controlled so that all receivers are at a common depth, or in other cases the receivers in each streamer are controlled to follow a particular depth profile.

Modern streamers are equipped with birds, compasses and GPS receiver buoys. Birds are devices equipped with fins, spaced at intervals that are in communication with the vessel to control streamer depth and transverse spatial position. Alternatively, the receivers can be stationary and positioned on the ocean floor as autonomous nodes or in an ocean bottom cable.

Depending upon the sensor type, the returning energy is recorded as a pressure, velocity or acceleration variation as a function of time at each receiver position. Combining recordings made at multiple source and receiver locations can be used to form an image of the subterranean features of the earth. Images formed from reflection seismology are useful for locating structures that are indicative of oil and/or gas reservoirs.

However, the frequency content of impulsive sources is not fully controllable, and different number, sizes and/or combinations of airgun sources are selected depending on the needs of a particular survey. In addition, the use of impulsive sources can pose certain safety and environmental concerns.

Thus, another class of sources that may be used is vibratory sources. For vibratory sources, the source signal excitation is typically a chirp (swept frequency sine wave excitation signal over a pre-determined sweep bandwidth for a predetermined time interval). The source array emits a chirp over a given sweep length as it is towed by a moving vessel. Typically, after some instrument reset period and/or listen time, the chirp is repeated to start a new recording for the new source/receiver position. Thus, a typical raw record includes both sweep and listen time. Correlation may be employed to collapse the data to produce a record that is similar to what might be obtained using an impulsive source. The technique of using a vibratory source followed by correlation to collapse the data is called Vibroseis.

An alternative to correlation is source signature deconvolution, whereby a measured source signal is used to convert the extended source signal to an impulse, which involves the performance of some form of spectral division. In source signature deconvolution, a fast Fourier transform (FFT), of a received signal and a measured source signal are taken using either uncorrelated or correlated data. A spectral quotient is formed in which the received spectrum is divided by the source frequency spectrum at each frequency. An array including the resultant spectral quotients is converted back to the time domain using an inverse Fourier transform operation (IFFT), to recover the earth impulse response.

Generally, seismic data acquired in marine surveys is superior to that collected in land surveys. Source coupling in water is much better and homogeneous than for land. On land, source coupling is much more variable than at sea because the vibrators shake on surfaces that can quickly change from sand to rocks to tree stumps, roads, mud, etc. The marine environment is generally quieter than for land surveys resulting in recordings with lower ambient noise levels.

However, there are special problems that arise in marine seismology. Because the source is located below the surface of the water, this gives rise to a surface reflection event referred to as a surface ghost. The acoustic reflection coefficient of the surface is essentially −1, so that up-going pressure waves radiated by the source undergo a polarity reversal when they reflect downward off the water's surface. These ghosts destructively and constructively interfere with the primary radiated energy from the source to produce spectral peaks and notches in the power spectrum of the radiated energy.

FIG. 2 depicts the effect of the source ghost on the power spectrum of a vertically propagating signal generated by two sources. The curve 200 corresponds to a source operating at a depth of 20 m and has notches in its spectrum at approximately 0, 37.5, 75, 112.5 and 150 Hz. For curve 202, the source is at 5 m depth and notches in its spectrum appear at 0 and 150 Hz. The curves in FIG. 2 have been normalized to their respective peak values. The surface ghost produces constructive energy to produce the curve peaks in FIG. 2.

It is also noted that at the very low end of the spectrum and below 30 Hz, the source at 20 m depth has significantly more output than the shallow source. Thus, if these ghosts are not addressed, they can lead to spectral deficiencies in the reflection data. The frequencies at which these notches occur are a function of the source depth and the ray path. Since most of the energy useful for acoustic illumination in reflection seismology is close to vertical, spectral notches produced for ray paths near vertical are of particular concern. Deficiencies in the spectral content of the radiated source energy can compromise the quality and resolution of the processed image.

Another matter of some concern for marine vibratory sources is the fact that the radiated energy is spread out over time. Because the vessel, source and receivers are moving, time and space are mathematically coupled. If the sources emit a swept frequency signal, the source spectrum changes as the source moves. Energy received will also be affected by motion. Generally, a correction for receiver motion is easier to calculate than a correction for source motion, because during a survey, the vessel moves in a straight line at constant speed and the receivers follow one another. Thus, during a sweep, one or more receivers will pass over the same position. Therefore, a simple interpolation method could be employed to combine adjacent receivers to create a virtual receiver that appears stationary.

For chirps, the lower the sweep rate, and/or as frequency is increased, the greater the resultant phase dispersion caused by Doppler shifting of the source sweep signal. In this respect, Allen (U.S. Pat. No. 6,049,507) teaches a method for correcting the source motion by sorting the data into constant dip slices by transforming the data into the F-K (frequency wavenumber) domain, computing and applying the necessary motion correction to each slice and then summing the results.

Just like their land counterparts, marine vibratory sources have spectral output limits imposed upon them by system constraints. These constraints may be mechanical, for example actuator stroke may limit the amount of travel of an acoustic driver thereby limiting the maximum peak temporal low frequency content of a sweep. For marine vibrators driven by hydraulic actuators, the maximum pump flow rate may limit the driver velocity and the hydraulic supply pressure may limit the force that can be developed at high frequency. Or, as can be the case for vibratory sources driven by electromagnetic actuators, electronic components may impose acoustic output constraints at other frequencies due to voltage and/or current limits.

Recently, a number of simultaneous source acquisition methods have been disclosed primarily for use in land seismic surveys that are useful for increasing the rate at which data can be acquired, thereby reducing the amount of time required to conduct a survey. Becquey (U.S. Pat. No. 6,704, 245) discloses a method for simultaneous acquisition of Vibroseis data that requires the use of maximal length binary coded sequences in combination with circular permutation.

Two schemes are disclosed. In one realization, all sources use time delayed versions of the same coded sequence, with each source array using a unique delay. Circular correlation is employed to separate the contributions of each source and then selecting the interval of interest ascribed to a particular source time lag. In an alternate implementation, unique maximal length codes are selected for each source array, and the different codes are selected to be mutually weakly correlated. Signals are simultaneously emitted into the ground and a composite record contains the superposition of the source emissions, each convolved with the earth impulse response representative of the signal path from the source through the earth and to the receiver. Circular cross-correlation of the received data with the different coded sequences is used to separate the source contributions to the composite record.

However, Becquey does not teach how to construct bandlimited signals of arbitrary length that do not rely on maximal length binary codes. Further, Becquey does not describe how to modify pseudorandom sequences to better suit their implementation on real hardware.

Sallas and Gibson (U.S. Pat. No. 7,859,945, the entire content of which is incorporated herein by reference) teach a method for generating and separating simultaneous emissions from ground seismic vibrators. That method creates pseudorandom signals that are only weakly correlated over a time window of interest. These signals are simultaneously emitted into the ground by vibrators occupying different locations. The superimposed signal, after traveling through the earth, is recorded using a shared receiver line. The composite record is correlated and windowed with the various excitation signals as well as measured source signals. After transforming the windowed correlated signals into the frequency domain using FFT's, a matrix separation method is used to separate the individual source computations frequency by frequency. The resultant matrix vectors are then frequency inverse transformed, back to the time domain, thereby creating a useful source signature deconvolution scheme.

Smith (U.S. Pat. No. 6,942,059) teaches a method whereby multiple marine vibrators are deployed at different depths to form a composite source array. For each depth a unique chirp sweep or suite of sweeps are prescribed. The source contributions for each depth can be separated by virtue of the fact that they either cover different bandwidths and/or have different sweep rates and/or have frequencies that overlap at different times. The objective of Smith is two-fold: to increase productivity by covering the overall seismic bandwidth more quickly and to eliminate the source ghost and the resultant spectral notches created by surface reflections.

One practical difficulty with this approach is that it does require a high combined source output energy level that is able to accomplish its stated objective of acquiring a shot gather in the same time as is done with air guns (typically 6 s).

To help mitigate problems associated with equipment constraints, Bagaini (U.S. Pat. No. 7,327,633) describes a method that takes a low frequency constraint due to actuator stroke into account in the design of vibrator chirp sweeps. Sallas (U.S. Patent Application Publication No. 2011/0085416) provides a vibrator bandwidth extension while honoring multiple equipment and environmental constraints. Both documents address just Vibroseis acquisition when swept sine wave sweeps (chirps) are to be employed.

In seismic acquisition, it is desired to perform the survey in the shortest amount of time possible. The faster a volume of data can be acquired without significant compromise to quality, the lower the cost of data acquisition. Thus, a method that can continuously and simultaneously record data from various sources without stopping is valuable. There is no need to repeatedly start and stop recording. Furthermore, a system that allows flexibility in the way the recorded data may be parsed later, during processing, provides an approach in which shot density can be increased to improve survey spatial sampling if desired.

Thus, there is a need to provide a method for reducing an acquisition time of a seismic survey performed with a vibratory source and also to provide a method for separating the recorded seismic data when two or more sources are used.

SUMMARY

According to one exemplary embodiment, there is a method for separating signals recorded by a seismic receiver and generated with at least first and second vibratory seismic sources driven with no listening time. The method includes a step of receiving seismic data that includes data d recorded by the seismic receiver and data related to the first and second vibratory seismic sources; a step of computing in a computing device a source separation matrix based on the data related to the first and second vibratory seismic sources; a step of calculating first and second earth impulse responses HA and HB corresponding to the first and second vibratory seismic sources, respectively, based on the data d recorded by the seismic receiver, the data related to the first and second vibratory seismic sources and the source separation matrix; and a step of separating the signals recorded by the seismic receiver based on the first and second earth impulse responses HA and HB such that signals originating from the first vibratory seismic source are disentangled from signals originating from the second vibratory seismic source.

According to another exemplary embodiment, there is a computing device for separating signals recorded by a seismic receiver and generated with at least first and second vibratory seismic sources driven with no listening time. The computing device includes an interface for receiving seismic data that includes data d recorded by the seismic receiver and data related to the first and second vibratory seismic sources; and a processing unit connected to the interface. The processor is configured to compute a source separation matrix based on the data related to the first and second vibratory seismic sources; calculate first and second earth impulse responses HA and HB corresponding to the first and second vibratory seismic sources, respectively, based on the data d recorded by the seismic receiver, the data related to the first and second vibratory seismic sources and the source separation matrix; and separate the signals recorded by the seismic receiver based on the first and second earth impulse responses HA and HB such that signals originating from the first vibratory seismic source are disentangled from signals originating from the second vibratory seismic source.

According to another exemplary embodiment, there is a computer-readable medium including computer executable instructions, wherein the instructions, when executed by a processor, implement the method discussed above.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a method for creating a suite of continuously repeated pseudorandom excitation signals for marine vibrators. However, the embodiments to be discussed next are not limited to a marine seismic source, but may be applied to other structures that generate a seismic wave having a controlled frequency range, for example, a land seismic source.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures, or characteristics may be combined in any suitable manner in one or more embodiments.

According to an exemplary embodiment, there is a method for creating a suite of continuously repeated pseudorandom excitation signals that are mutually weakly correlated during a listen time. The signals may be modified to honor source limits to help maximize radiated output subject to those constraints. The suite of pseudorandom signals can be downloaded into a source interface unit (a computer and/or other suitable electronic instrument that has been programmed and configured to excite and control one or more sets of marine vibrators). The marine vibrators and receiver sensors are towed behind a vessel (or vessels) equipped with the source interface unit, a data recording system, a navigation and source streamer control equipment. Alternatively, it is anticipated that receiver sensors can also be stationary, for example, deployed in autonomous nodes on the ocean floor or in an ocean bottom cable.

Upon command by the source interface unit, the suite of pseudorandom signals are simultaneously emitted by various vibrator sources or source arrays deployed at different depths or locations and recorded into common receivers to form a composite record. The method may include algorithms for separating the composite record into shot gathers corresponding to each source array. The separated contributions can then be combined in subsequent processing steps to mitigate issues associated with source ghosts, and source/receiver motion. These novel concepts are now discussed in more detail.

Figure 3:
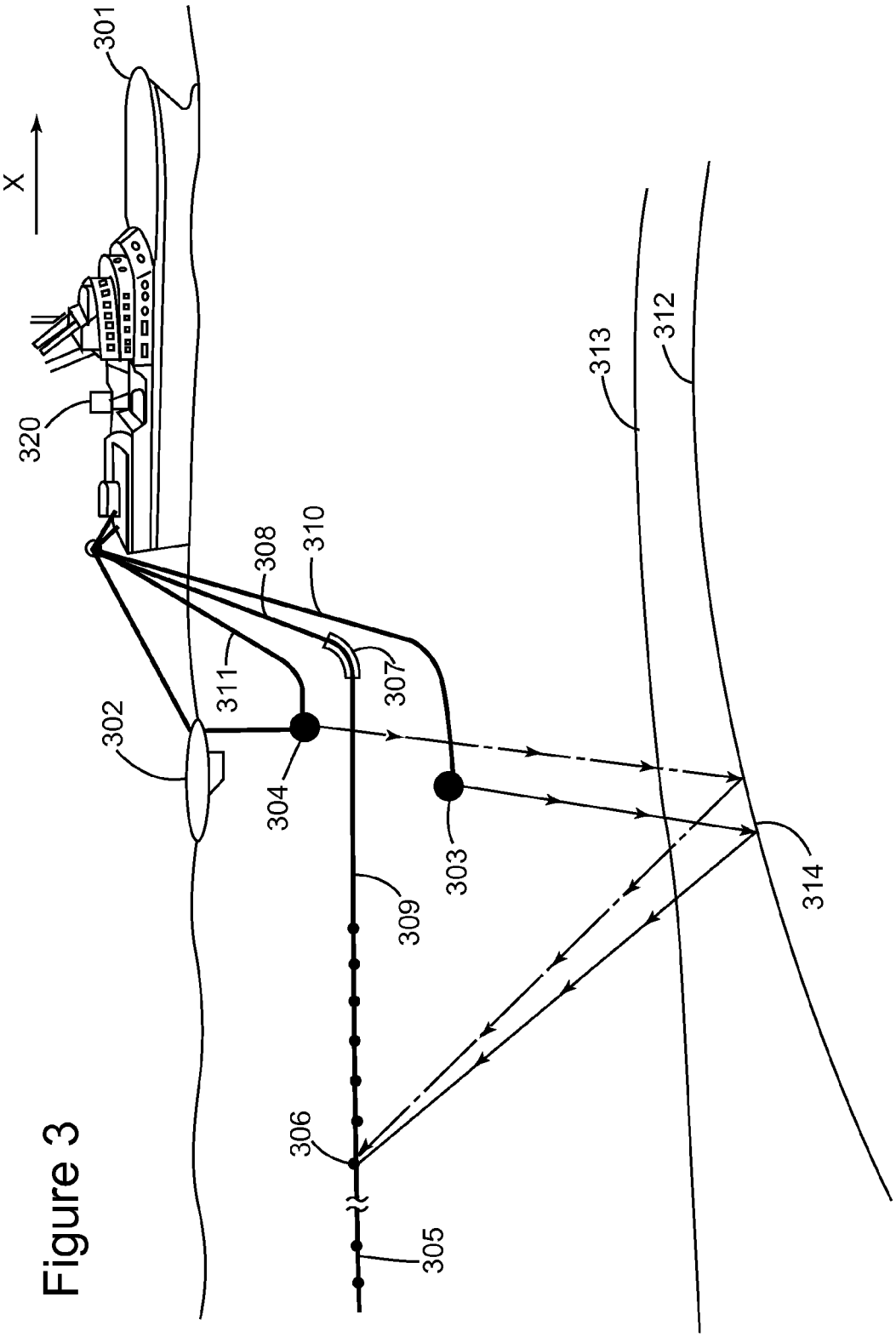
FIG. 3 illustrates a seismic survey system according to an exemplary embodiment.

Turning to FIG. 3, a vessel 301 tows a float 302 that can be steered at the sea surface. Two marine sources 303 and 304 are suspended from the float 302 (or from different floats) at fixed, different depths. The sources 303 and 304 may include one or more vibrators, suspended from one or more floats. The low frequency vibratory source 303 is deployed at a first depth, for example 20 m. At the same time, the high frequency vibratory source 304 is towed at a shallow depth, for example 5 m. The vessel 301 also tows the streamer 305 that contains multiple receivers 306 (typically hydrophones that are responsive to sound pressure signals in water). Multiple hydrophones are typically interconnected to form a receiver in-line array that may span 12.5 m; this is referred to as a "receiver group" with a "group interval" of 12.5 m.

The streamer is equipped with A/D converters (not shown) to digitize each receiver group output with the digitized data sent through electrical or optical fiber cable back to the vessel to be recorded. In addition, a diverter 307 may be used to pull the streamer section out to a prescribed operating width. The diverter is attached to the vessel through a lead in section 308. There is also a stretch section 309 located between the diverter 307 and streamer 305 to mitigate tow noises and reduce jerk forces on the streamers that can be quite long, posing a corresponding large inertial load. It will be noted that a different vessel may be deployed to tow the sources separately from the vessel used to tow the streamer(s). Also note that rather than a float, a submerged header equipped with control surfaces (fins) could be towed behind the boat with the sources following behind it, thereby mitigating noise and source depth variations due to swells.

The two sources 303 and 304 are equipped with electronics suitable for driving/controlling their actuators and receiving power from the vessel and control commands through cables 310 and 311 that connect to the vessel's source interface unit 320. The streamers may be equipped with GPS systems in tail buoys (not shown), birds (not shown) for streamer depth and position control, compasses (not shown) at intervals along the streamer length and/or other devices useful for measuring streamer position and/or streamer shape (this information being useful for determining the receiver group positions for each point in time). Tracing one energy ray path, e.g., an acoustic emission by marine vibrator 303, it is noted that the ray propagates through the water, passes through the ocean bottom 313 where it may strike a reflector, for example, a point located on an interface 312 between two subterranean layers (e.g., a silt layer and a rock layer). A portion of the incident energy is reflected back toward the surface and propagates back through the ocean bottom 313 and through the water where the reflected energy strikes a hydrophone 306. The hydrophone transducer converts the received acoustic energy into electrical energy that is sampled by an A/D converter into a numeric value. The digital data is multiplexed with data received by other receiver groups and transmitted through the streamer 305 back to the onboard seismic acquisition system where it is recorded. At the same time, a signal representative of the vibrator output from source 303 is digitized and transmitted back to the vessel via a data transmission conduit located in cable 310 for integration with the receiver data set.

Figure 4:
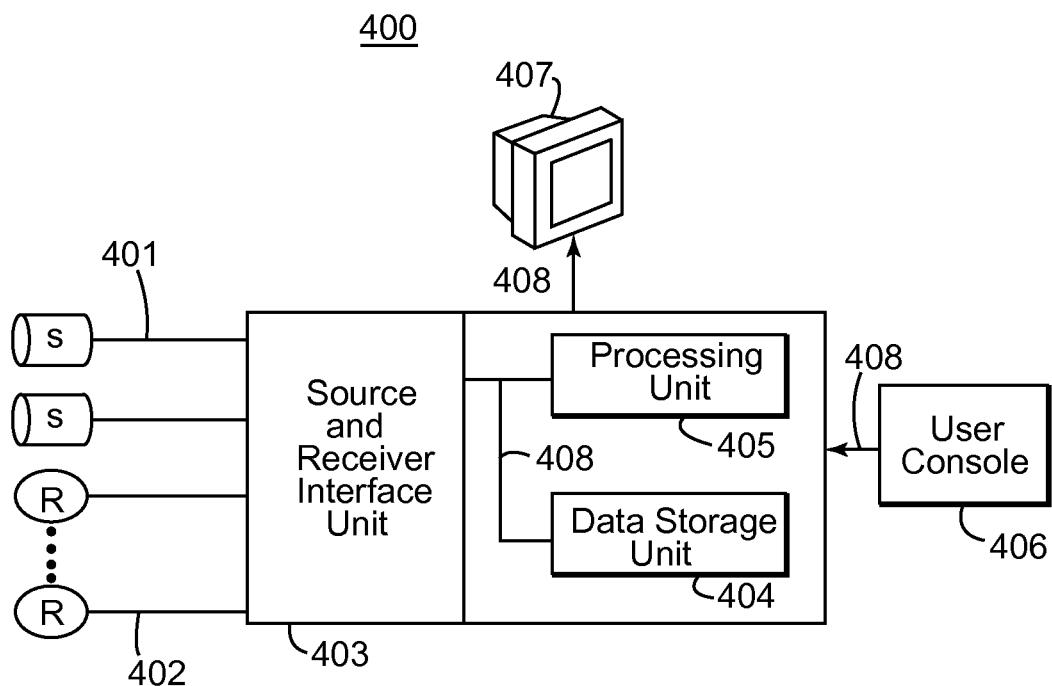
FIG. 4 is a schematic diagram of a marine vibratory data acquisition system in accordance with an exemplary embodiment.

An example of a seismic data acquisition system is shown in FIG. 4. The seismic data acquisition system 400 may include a user console 406 (for example: a keyboard, buttons, switches, touch screen and/or joy stick) to provide a means for personnel to enter commands and configuration into the system. A display device 407 can be used to show: streamer position, visual representations of acquired data, source and receiver status information, survey information and other information important to the seismic data acquisition process. A source and receiver interface unit 403 receives the hydrophone seismic data though the streamer communication conduit 402 as well as streamer position information; the link is bi-directional so that commands can also be sent to the birds to maintain proper streamer positioning. The source and receiver interface unit 403 also communicates bi-directionally with the sources through the source communication conduit 401. Source excitation, source control signals, measured source output signal, source status information can be exchanged through this link between the seismic data acquisition system and the marine vibrator controller. The user console 406, the source and receiver interface unit 403, a processing unit 405, data storage unit 404 and the display 407 are all linked together through a seismic data acquisition system communication bus 408. The bus 408 allows a data pathway for things like: the transfer and storage of data that originate from either the source sensors or streamer receivers; for processing unit 405 to access stored data contained in the data storage unit 404 memory; for the processing unit 405 to send information for visual display to the display unit 407; or for the user to send commands to system operating programs that might reside in either the processing unit 405 or the source and receiver interface unit 403.

Figure 5:
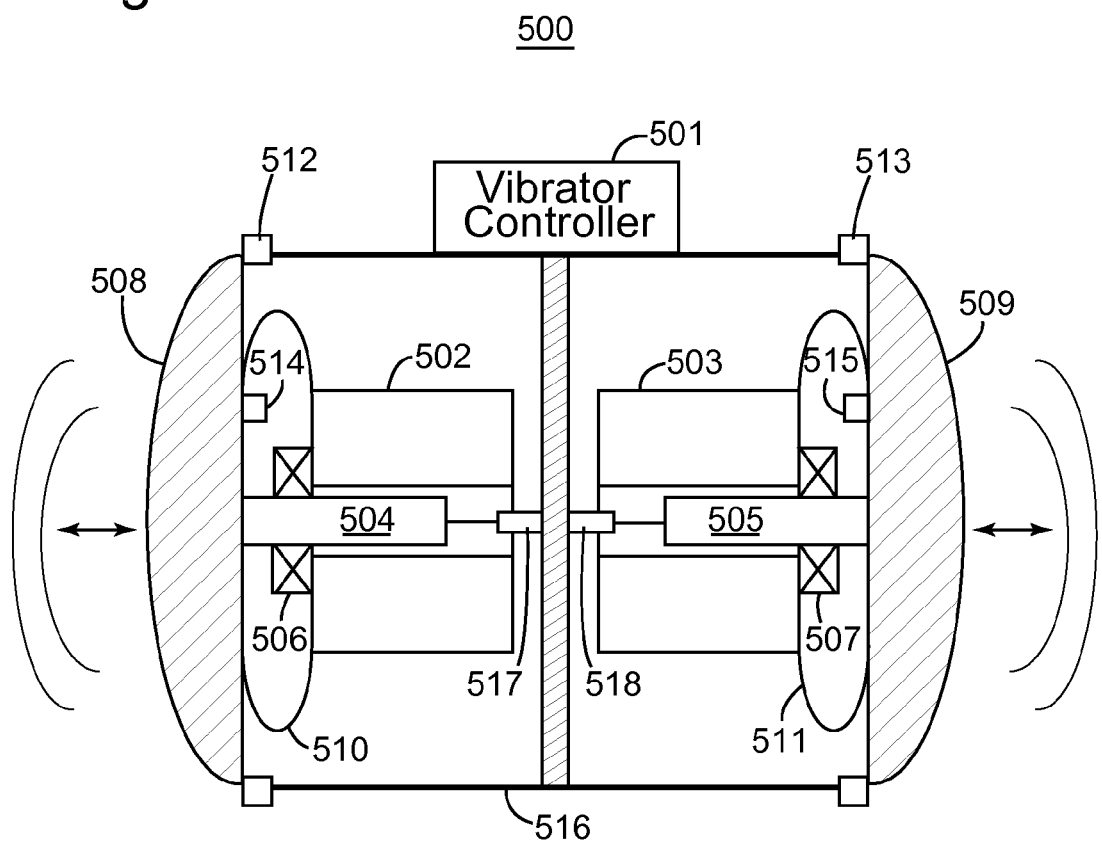
FIG. 5 is a schematic diagram of a marine vibratory source according to an exemplary embodiment.

An example of a vibratory source element (303 or 304) is now discussed with regard to FIG. 5. The source element 500 is configured as a twin driver. Other types of source elements may be used. In this embodiment, the acoustic source element 500 employs moving magnet electromagnetic actuators, but alternate implementations that employ moving coil, pneumatic or hydraulic actuators may be used instead. The twin driver is comprised of an enclosure 516 that is pressurized with air to balance the hydrostatic pressure of the water at depth.

External pressurized air can be supplied via a hose (not shown) to an air tank located on float 302 or to a tank or air compressor located on the vessel 301. A vibrator controller 501 receives excitation signals and external electrical power from the source and receiver interface unit 403 located on the vessel. The vibrator controller 501 contains a feedback control system to ensure that the acoustic output is synchronized and spectrally matches the excitation signal. The vibrator controller 501 may include: DC power supplies to convert AC power from the vessel; power amplifiers suitable for driving the stators 502 and 503 of the moving magnet actuators; a CPU programmed to run control algorithms; a set of ND converters to digitize feedback signals; and a small communications unit to buffer, send and receive signals to/from the source and receiver interface unit 403.

When the vibrator controller 501 receives an excitation signal, its power amplifier applies a current to the coils 502 and 503 that are mounted within a steel laminate stator structure. When the coil current changes, the magnetic field changes in the magnetic circuit formed between the stator assembly, air gap and permanent magnet armature. The permanent magnets located in the armature 504 and 505 react to the change in the air gap magnetic field and will cause the armature to undergo linear motion. The moving magnet armatures 504 and 505 are rigidly attached to pistons 508 and 509, respectively, that are in contact with the surrounding water.

Bearings 506 and 507 keep the armature centered. Springs 510 and 511, for example, leaf springs, help to maintain proper alignment as well as provide zero-force centering. The pistons 508 and 509 are connected to the enclosure 516 about their perimeter via a circumferential sealing mechanism 512 and 513, which may be formed with metal bellows, or other suitable means that allow for axial motion while at the same time preventing water ingress to the enclosure interior. The pistons 508 and 509 are approximately 1 meter in diameter.

A displacement sensor, for example LVDTs 517 and 518 provide piston position feedback information to the vibrator controller 501, which can be used by a pneumatic regulator located inside the vibrator controller to maintain hydrostatic equilibrium. Acceleration sensors, e.g., accelerometers 514 and 515 are attached to the pistons so that the axial acceleration of the pistons can be measured. For sources that are small compared to the sound wavelength in water, the piston acceleration provides a useful estimate of the source acoustic output. The LVDTs 517 and 518 output, in combination with accelerometers 514 and 515 signals, can be combined in the vibrator controller to provide useful feedback to adjust the power amplifier output to ensure that the piston acceleration matches the source excitation signal. The vibrator controller 501 is configured so that the piston motion is synchronized with both pistons moving outward together or inward together, thereby acting as a volumetric acoustic source. By virtue of the fact that the source is symmetric tends to mitigate unwanted enclosure vibration. The accelerometers 514 and 515 signal are digitized by the vibrator controller 501 and transmitted back to the source and receiver interface unit 403 for integration with the receiver data.

From this description of the source, it can be appreciated that there are both electrical and mechanical limits for the source's actuator. For an electromagnetic actuator, the limits may include: stroke limits imposed by actuator travel; velocity constraints due to concerns about wear life of bearings, bushings and seals; acceleration constraints to avoid cavitation for sources operating at shallow depth; current constraints due to power amplifier or actuator performance issues; and voltage constraints due to power supply, amplifier ratings, or breakdown of wire insulation. To illustrate this idea, consider output constraints for both a low frequency vibrator (LFV) that is towed at a depth of 20 m and a high frequency vibrator (HFV) that is towed at a depth of 5 m. Because the frequency ranges for the LFV and HFV are different, it can be appreciated that to optimize performance, the size and ratings for the various components used in the LFV and HFV drivers may be different, thereby presenting different equipment constraints. For this example, consider the following equipment ratings:
LFV peak limits:
displacement=14 mm
velocity=2 m/s
current=40 A
voltage=400 V, and
for HFV peak limits:
displacement=7 mm
velocity=2 m/s
current=40 A
voltage=400 V.

Figure 6A:
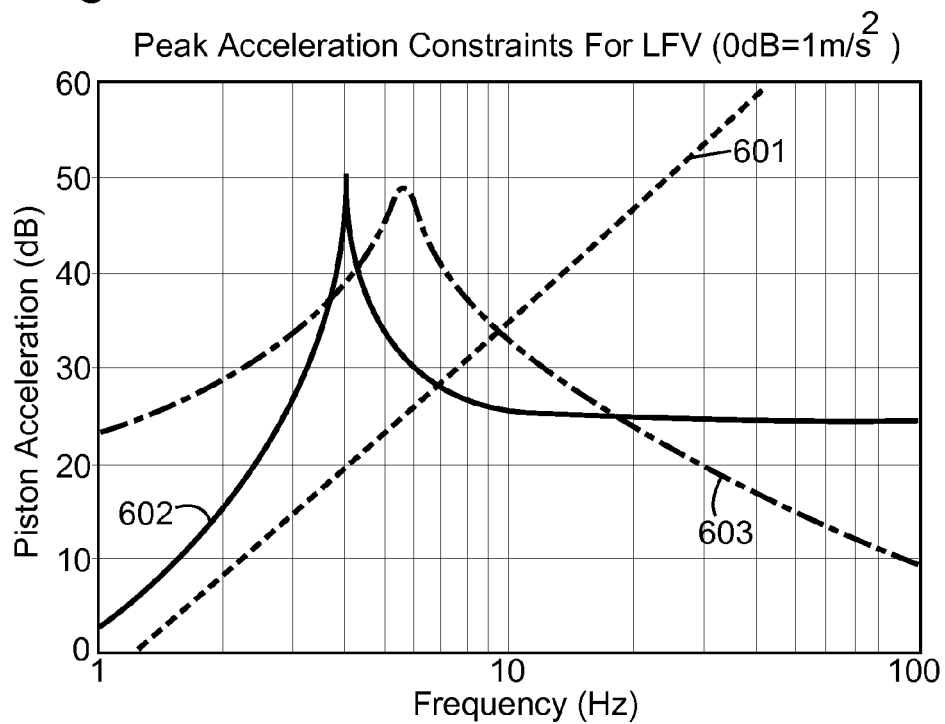
FIGS. 6A-B are charts showing various constraints that limit a vibrator output according to an exemplary embodiment.
Figure 6B:
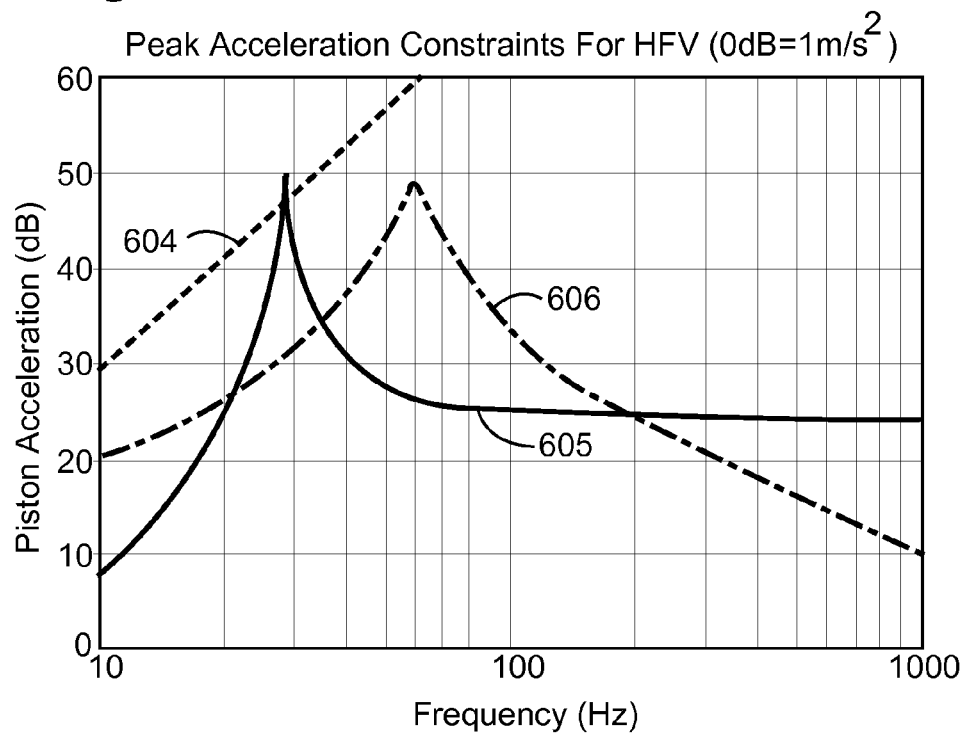

Referring now to FIGS. 6A and 6B, the constraint imposed on peak piston acceleration vs. frequency is plotted due to each mechanical or electrical peak limit that would apply under sinusoidal excitation. Because operating/acoustic source coupling conditions are so uniform in the underwater environment, the actuator performance is very stable/predictable. The constraints for the LFV are illustrated in FIG. 6A and for the HFV are illustrated in FIG. 6B (the velocity constraint is not shown, because for this example it does not constrain performance). By modeling, using information provided by the manufacturer, or by empirical measurement, the various transfer functions relating the piston acceleration output to the variable of interest input can be computed. The resultant piston output acceleration (on a dB scale relative to 1 m/s$^2$ peak acceleration) is plotted versus frequency in FIGS. 6A-B when the following limits are applied: the piston displacement 601 and 604, piston velocity (not shown), actuator current 602 and 605, and actuator voltage 603 and 606. As can be seen, the relationships are frequency variant due to many factors, for example, a mass/spring resonance near 4 Hz on graph 602, where the effective mass is the sum of the piston/armature and effective radiation impedance of the water and the effective spring formed by combining the contributions of the spring effect of the enclosure trapped pressurized air/leaf springs 510 and 511 and bellows 512 and 513.

Other factors influencing the transfer function include but are not limited to: actuator coil resistance, actuator coil inductance, actuator force factor, and amplifier dynamics. It will be noted also, that as the frequency changes, the limiting parameter that constrains output may/can change. Thus, for example, referring to FIG. 6A, the overriding limit that constrains output of the LFV are: displacement 601 over the range of 1-7 Hz, current limits output over the range of 7-20 Hz and voltage over the frequency range of 20-100 Hz. The overriding constraint for a particular frequency on output acceleration is the local minimum of the various constraint curves.

The curves illustrated in FIGS. 6A and 6B may be sufficient to predict constraints for sources using sinusoidal excitations that might occur while using chirps. However, while these curves are useful, they are not sufficient when pseudorandom excitation signals are used. Because pseudorandom signals have many frequencies present at once, it is not possible to predict the effect they have on constraining the peak output using only the transfer function amplitudes shown in FIGS. 6A and 6B. The phase spectrum needs to also be considered.

To handle the pseudorandom signals, Laplace transfer function representations of the relationships that exist between the various limiting parameters and acceleration are most useful. They provide a tool to calculate instantaneous values of: displacement, velocity, current or voltage for a predefined acceleration waveform. Use of the Laplace transfer function provides a way to evaluate instantaneous acceleration constraints when arbitrary excitation signals are applied, like pseudorandom signals.

The various transfer functions expressed in the Laplace domain are defined below, where "s" is the Laplace operator. "s" becomes "$i\omega$" in the Fourier or frequency domain with the Greek letter iota "ι" being the square root of −1 and "ω" being the natural frequency (radians/s)

With this notation, for both LFV and HFV, the following transfer functions are introduced to transform the displacement, current and voltage to the acceleration domain or to transform the acceleration to the displacement, current and voltage as follows:

$$Disp(s) := (s)^2 - \zeta^2 \tag{1}$$

and $$IDisp(s) := \frac{1}{Disp(s)} \tag{2}$$

with Disp, IDisp and $\zeta$ being explained below.
For LFV, $$LCur(s) := \frac{LKcur\left[\left(\frac{s}{wLc}\right)^2 - \left(\frac{\zeta}{wLc}\right)^2\right]}{\left(\frac{s}{wLc}\right)^2 + 0.05 \cdot \left(\frac{s}{wLc}\right) + 1} \tag{3}$$

$$LVolt(s) := \frac{LKvolt\left(\frac{s + \iota \cdot \zeta}{wLc}\right)}{\left(\frac{s}{wLv}\right)^2 + 0.2 \cdot \left(\frac{s}{wLv}\right) + 1} \tag{4}$$

$$ILCur(s) := \frac{1}{LCur(s)} \tag{5}$$

$$ILVolt(s) := \frac{1}{LVolt(s)} \tag{6}$$

with coefficients:
$\zeta = \pi$ radians/s, wLc=$2\pi(4)$ radians/s, LKcur=0.4 m/A-s$^2$, wLv=$2\pi(5.5)$ radians/s,
and LKvolt=0.13 m/V-s$^2$.
The coefficient "wLc" is the natural frequency in the current transfer function corresponding to the 4 Hz system resonance in evidence as a peak in graph 602. The coefficient "wLv" is the natural frequency in the voltage transfer function in evidence as a peak at 5.5 Hz in graph 603.

For the HFV, the following equations hold:

$$HCur(s) := \frac{HKcur\left[\left(\frac{s}{wHc}\right)^2 - \left(\frac{\zeta}{wHc}\right)^2\right]}{\left(\frac{s}{wHc}\right)^2 + 0.05 \cdot \left(\frac{s}{wHc}\right) + 1} \tag{7}$$

$$HVolt(s) := \frac{HKvolt\left(\frac{s + \iota \cdot \zeta}{wHv}\right)}{\left(\frac{s}{wHv}\right)^2 + 0.2 \cdot \left(\frac{s}{wHv}\right) + 1} \tag{8}$$

$$IHCur(s) := \frac{1}{HCur(s)} \tag{9}$$

$$IHVolt(s) := \frac{1}{HVolt(s)} \tag{10}$$

with coefficients: wHc=$2\pi(28)$ radians/s, HKcur=0.4 m/A-s$^2$, wHv=$2\pi(58)$ radians/s, and HKvolt=0.13 m/V-s$^2$.
The coefficient "wHc" is the natural frequency in the current transfer function corresponding to the 28 Hz system resonance in evidence as a peak in graph 605. The coefficient "wHv" is the natural frequency in the voltage transfer function in evidence as a peak at 58 Hz in graph 606. "HKcur" is a conversion coefficient from acceleration to current and "HKvolt" is a conversion coefficient from acceleration to voltage.

In Equation (1), the function "Disp(s), describes a transform useful for mapping displacement into acceleration (displacement filter) that applies to both the LFV and HFV, while in equation (2), the function "IDisp(s)" is the reciprocal function that maps the acceleration into the displacement (reciprocal displacement filter). Likewise, in equation (3) the function "LCur(s)" for the LFV; and in equation (7) the function "HCur(s)" for the HFV map the current into piston acceleration (current filter) while in equation (5) "ILCur(s)" and in equation (9) "IHCur(s)" are the corresponding reciprocal functions (reciprocal current filter). Also, in equation (4) "LVolt(s)" and in equation (8) "HVolt(s)" are functions useful for mapping the voltage into acceleration for the LFV and HFV respectively (voltage filter), with corresponding reciprocal functions (6) "ILVolt(s)" and (10) "IHVolt(s)" (reciprocal voltage filter).

The coefficient represented by the Greek letter zeta "$\zeta$" was inserted to stabilize the reciprocal function for all frequencies. Thus, the selected value for $\zeta$ will only have effect for very low frequencies (below 1 Hz), which are frequencies well below operating the excitation frequencies of interest. Returning to FIGS. 6A-B, by evaluating the magnitude of the LFV Current Filter (equation 3) at different frequencies (substitute s→ιω→ι2 π f, with f in Hz) and then multiplying it by 40 amps (the current limit), it is possible to estimate the peak piston acceleration for sinusoidal excitation. When the peak piston acceleration is plotted, this corresponds to curve 602 after the acceleration is converted to a dB scale by taking its amplitude (Y) relative to 1 m/s$^2$ (X) (in other words, Y is converted to dB by 20 log$_{10}$ (Y/X)).

For the case of pseudorandom excitation signals that represent the desired piston acceleration, digital versions of the reciprocal filters can be implemented on a digital computer to estimate displacement, velocity, current and voltage. The pseudorandom excitation signal can be convolved with the various reciprocal filters to predict displacement, velocity, current and voltage waveforms. Convolution in the time domain corresponds to multiplication in the frequency domain. So by taking an FFT of the excitation signal and then multiplying it by the value of the reciprocal filter for each frequency point of the FFT and then performing an IFFT to take the result back to the time domain, waveform estimates for the piston displacement, piston velocity, actuator current and actuator voltage can be computed. Those waveform estimates can then be evaluated to determine their respective peak values and compared to their respective limits.

Figure 1:
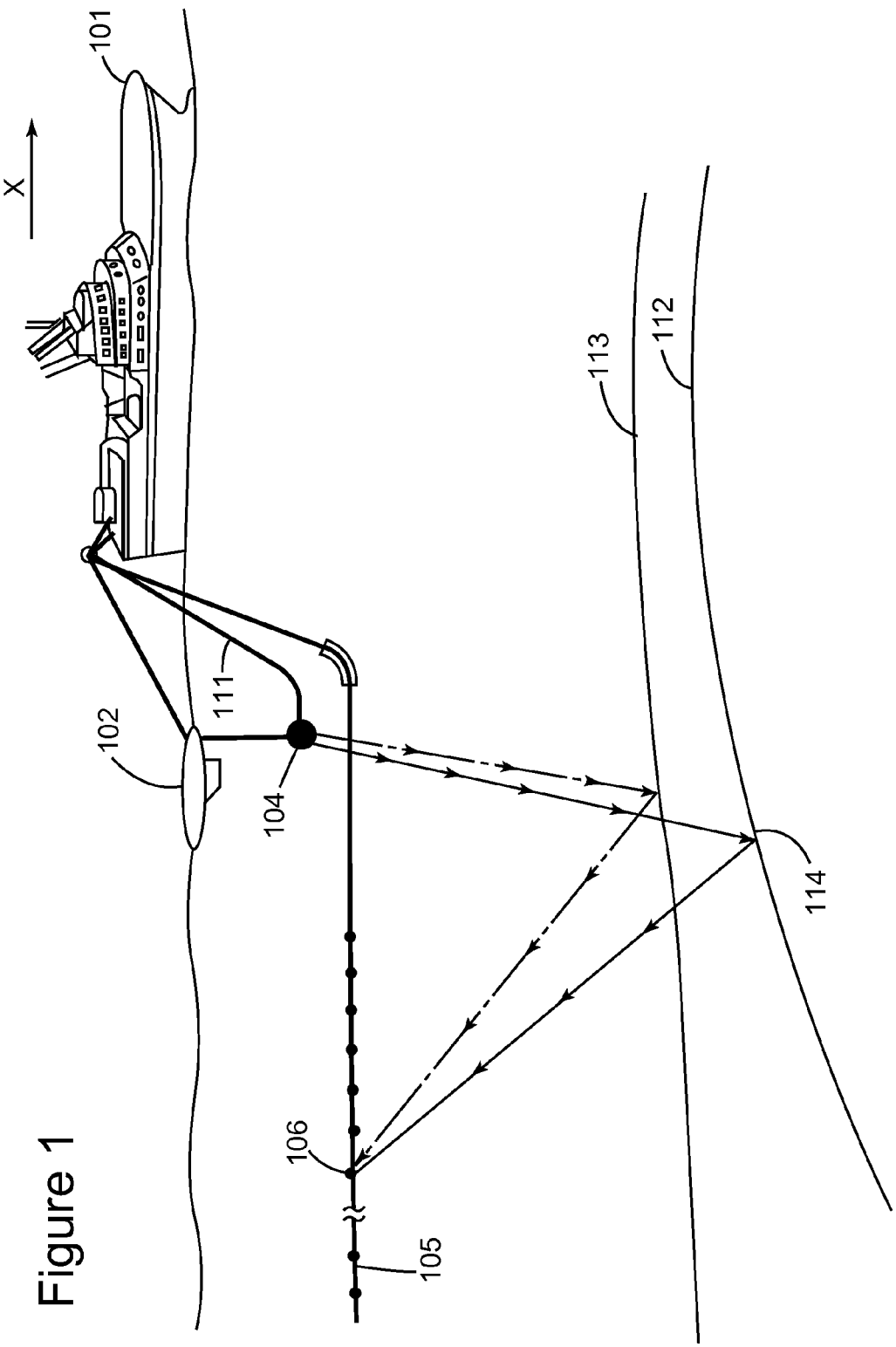
FIG. 1 illustrates a traditional marine seismic survey system.
Figure 2:
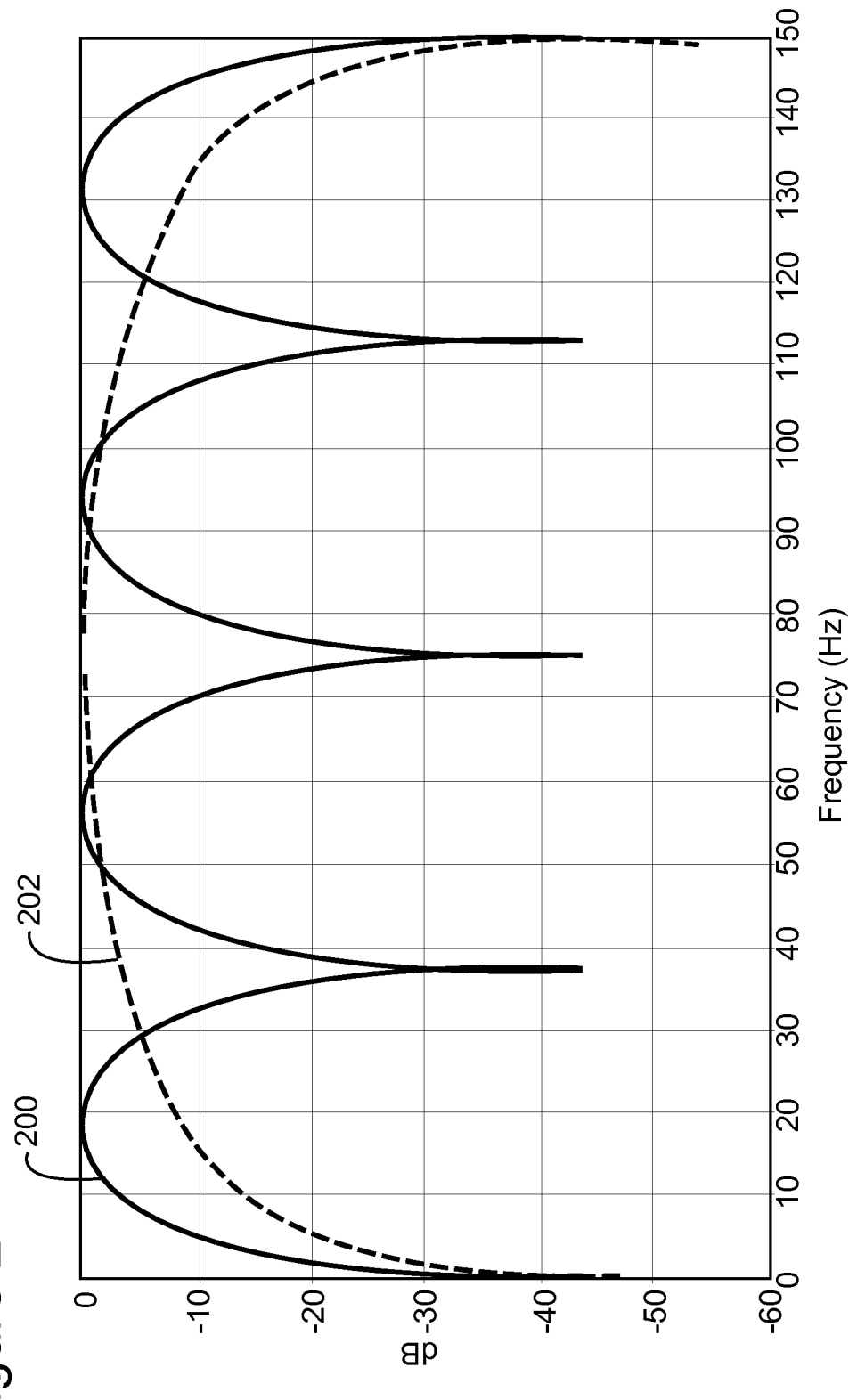
FIG. 2 is a graph comparing the effect that a surface ghost reflection has on a power spectral density plot for ideal sources operating at two different depths.

As previously discussed, it is desirable that the source emission spectrum does not contain notches. Referring now back to FIG. 2, it can be seen that sources operating at 20 m (curve 200) have effectively more low frequency output than do shallow sources operating at 5 m depth (curve 202). However, the deep source has several notches, while the shallow source does not. By operating sources at two depths with excitation signals that do not destructively interfere, a composite spectrum that does not have notches over the seismic band of interest (typically, 5-100 Hz) can be produced. It is anticipated that in some seismic surveys, for example where notches fall outside the frequency band of interest or of little concern for other reasons, marine vibratory sources may be towed at only one depth in which case an excitation signal compatible with the source constraints is still required, but generation of two non-interfering excitation signals may not be needed; and for this case only a single pseudorandom excitation signal is used.

Figure 7:
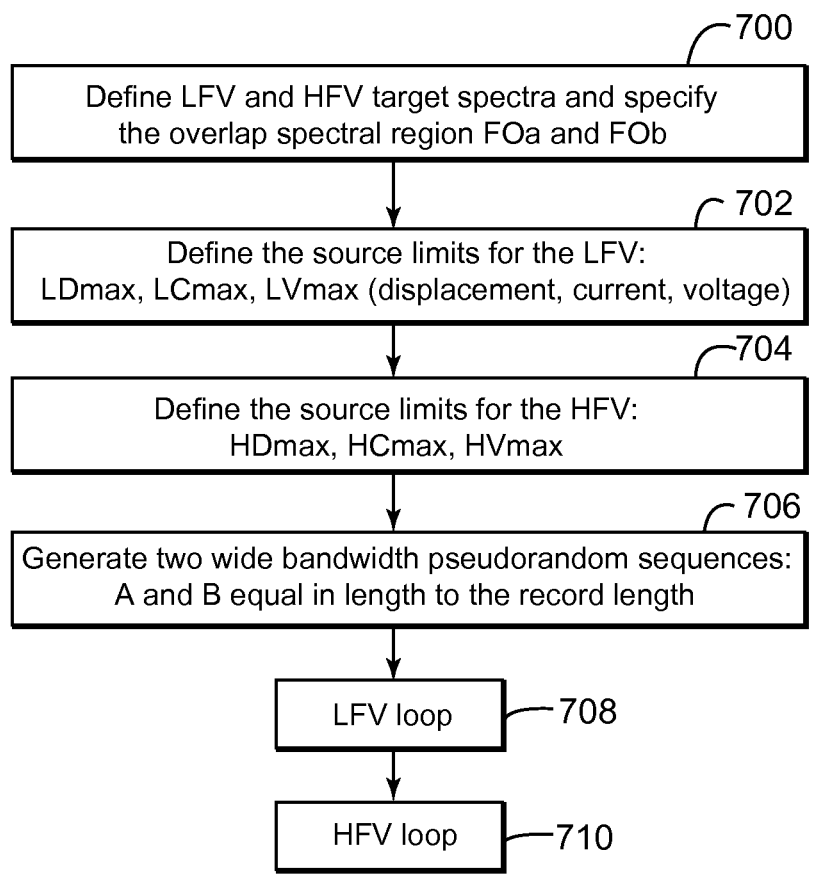
FIG. 7 is a flow chart of a method for determining pseudorandom excitation signals for operating continuously two vibratory sources according to an exemplary embodiment.

Next, a process for generating source excitation signals is discussed with reference to FIG. 7. It is noted that the source excitation signals are calculated prior to using the sources. FIG. 7 is a flow chart that details the steps employed to create two pseudorandom signals that can be used to excite marine vibrators operated at two different depths. Furthermore, the pseudorandom signals are designed so that the two marine vibrators operate simultaneously and can be operated continuously for increased productivity and without interference.

Figure 10A:
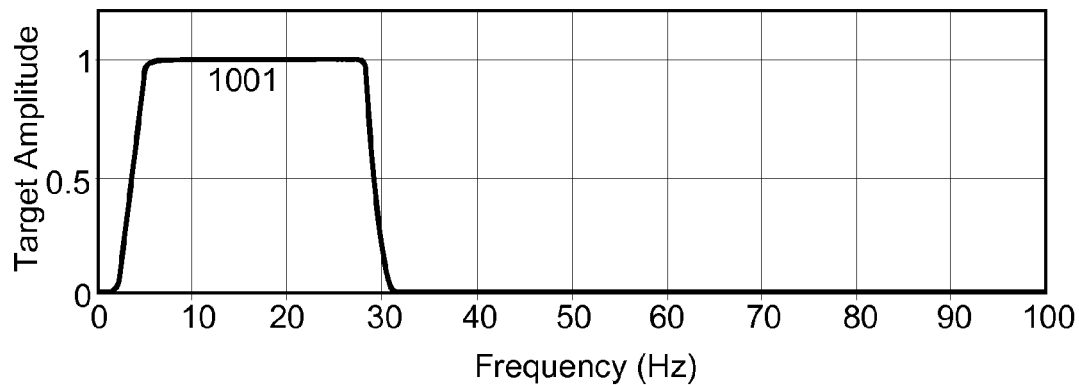
FIGS. 10A-C is an illustration of two source amplitude target spectra and the resultant objective composite spectrum according to an exemplary embodiment.
Figure 10B:
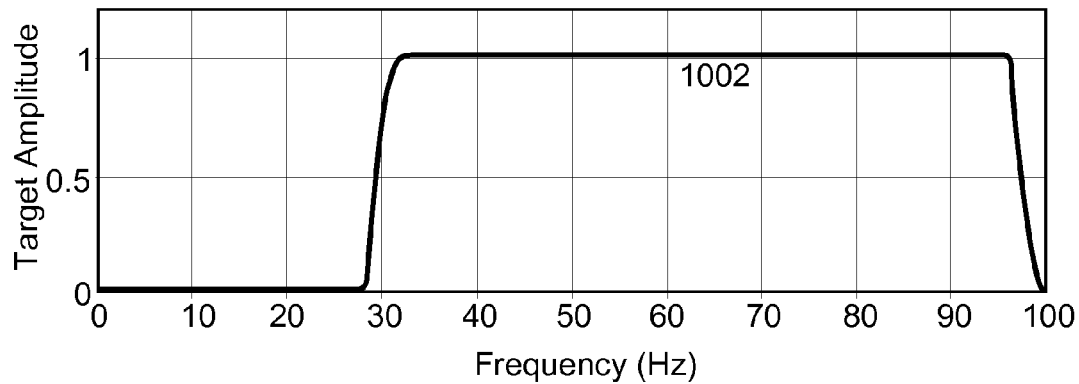

In steps 700 to 706, the desired target spectrum for each source is defined and the limiting parameters for each device are specified. For example, target spectra, as shown in FIGS. 10A and 10B, are selected, where curves 1001 and 1002 correspond respectively to the desired LFV and HFV normalized target spectrum displayed on a linear scale. The composite target spectrum 1003 was selected to cover the seismic frequencies of interest, while the partitioning of the spectrum is determined based upon knowledge of the depth at which the vibrator sources are to operate, for this example the depths were 20 m and 5 m for the LFV and HFV, respectively, in combination with vibrator performance specifications.

The LFV target spectrum 1001 in this example was chosen to smoothly taper up in amplitude starting at 2 Hz, then maintain full output over the range of 6-28 Hz, and then smoothly taper down to zero output at 32 Hz. The HFV target spectrum 1002 smoothly tapers up in amplitude starting at 28 Hz, maintains full amplitude over the range of 32 Hz to 96 Hz, and smoothly tapers down to zero at 100 Hz. It is desired that a smooth target spectra be employed, because, in general, corners or discontinuities in a signal amplitude spectrum indicate undesirable artifacts in the signals autocorrelation function, like high side-lobe levels. Note that for this embodiment the target spectra were chosen to be spectrally flat; but other shapes can be used, for example, a target spectrum that increases in amplitude with frequency to compensate for earth absorption.

Figure 10C:
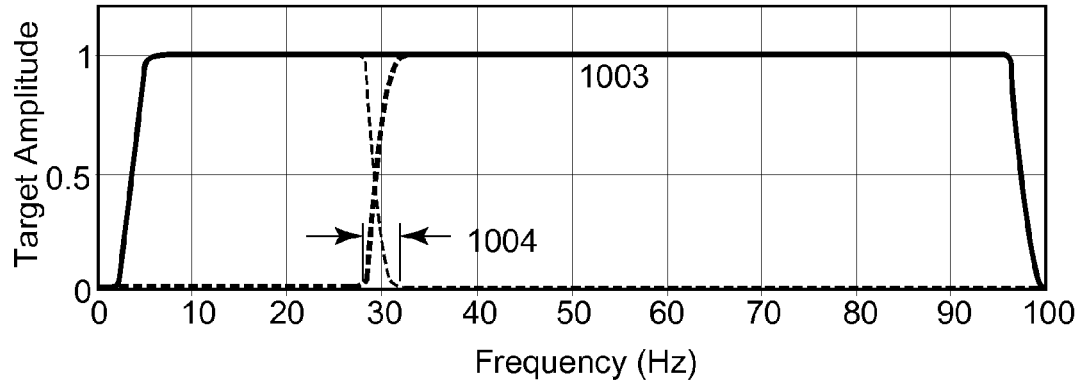

The composite spectrum is illustrated in FIG. 10C as curve 1003 and represents the combined spectral output of LFV and HFV excitation signals. The frequency interval 1004 denotes the spectral overlap region between the LFV and HFV sources, over which both sources have some output. The spectral overlap 1004 range is (FOa, FOb), for this example, and extends from 28 to 32 Hz. Thus, some starting sequences are generated using a random number generator whose length is equal to the desired sweep length (approximately 16.4 s for this example with a 2 ms sampling interval) and "N" is the number of samples in the prescribed record. In general, the algorithm employed to create these starting sequences is unimportant, for example the Mathcad random number generator "rnorm( )" was used to generate a sequence with a normal distribution sequences with a zero mean and a standard deviation of 3.

Figure 11A:
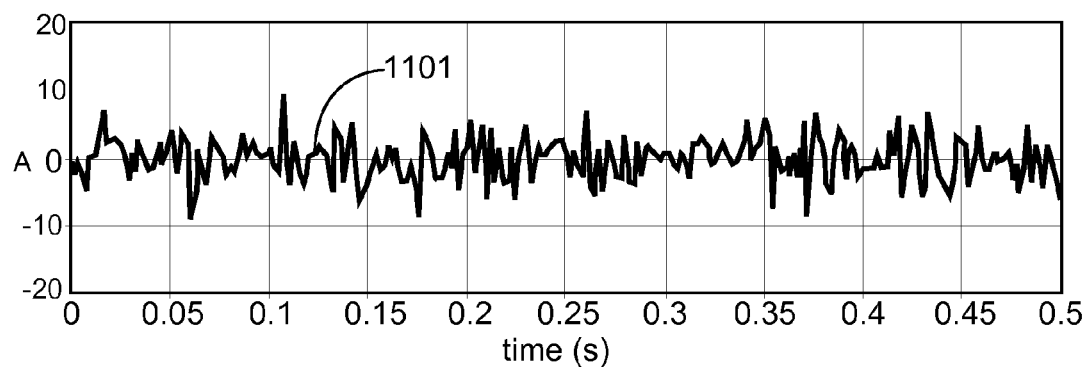
FIGS. 11A-B are an illustration of the originating excitation sequences according to an exemplary embodiment.
Figure 11B:
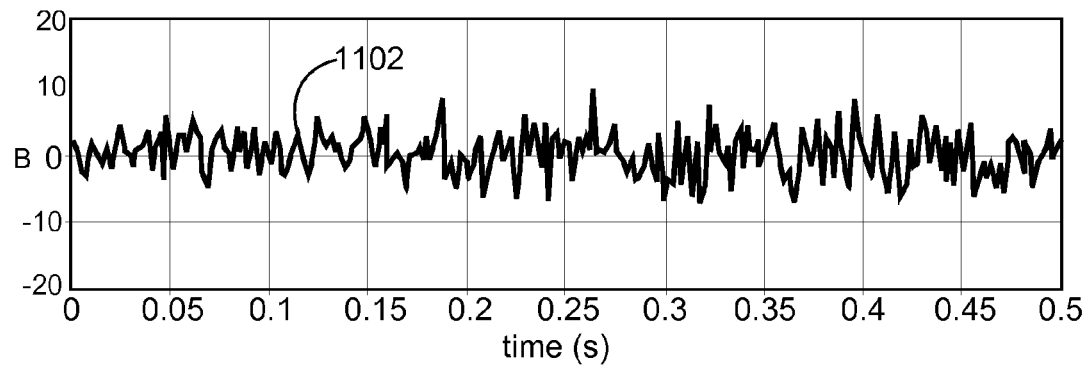

In this respect, FIGS. 11A and 11B depict the first 0.5 s of the starting sequence A 1101 and B 1102, respectively, that will be modified to become the excitation signals representative of the desired piston acceleration output signals for the LFV and HFV sources respectively. The sample interval for the digital representation of these signals is 2 ms. The starting sequences A and B are generated in step 706 in FIG. 7. It is noted that the source limits considered in steps 704 and 706 may vary from survey to survey or from source element to source element.

Continuing with FIG. 7, an iterative loop is formed in step 708 to modify sequence "A" to form a useful LFV excitation signal. After the LFV excitation signal is determined in step 708, the algorithm advances to step 710 in which the HFV excitation signal is generated.

Figure 8:
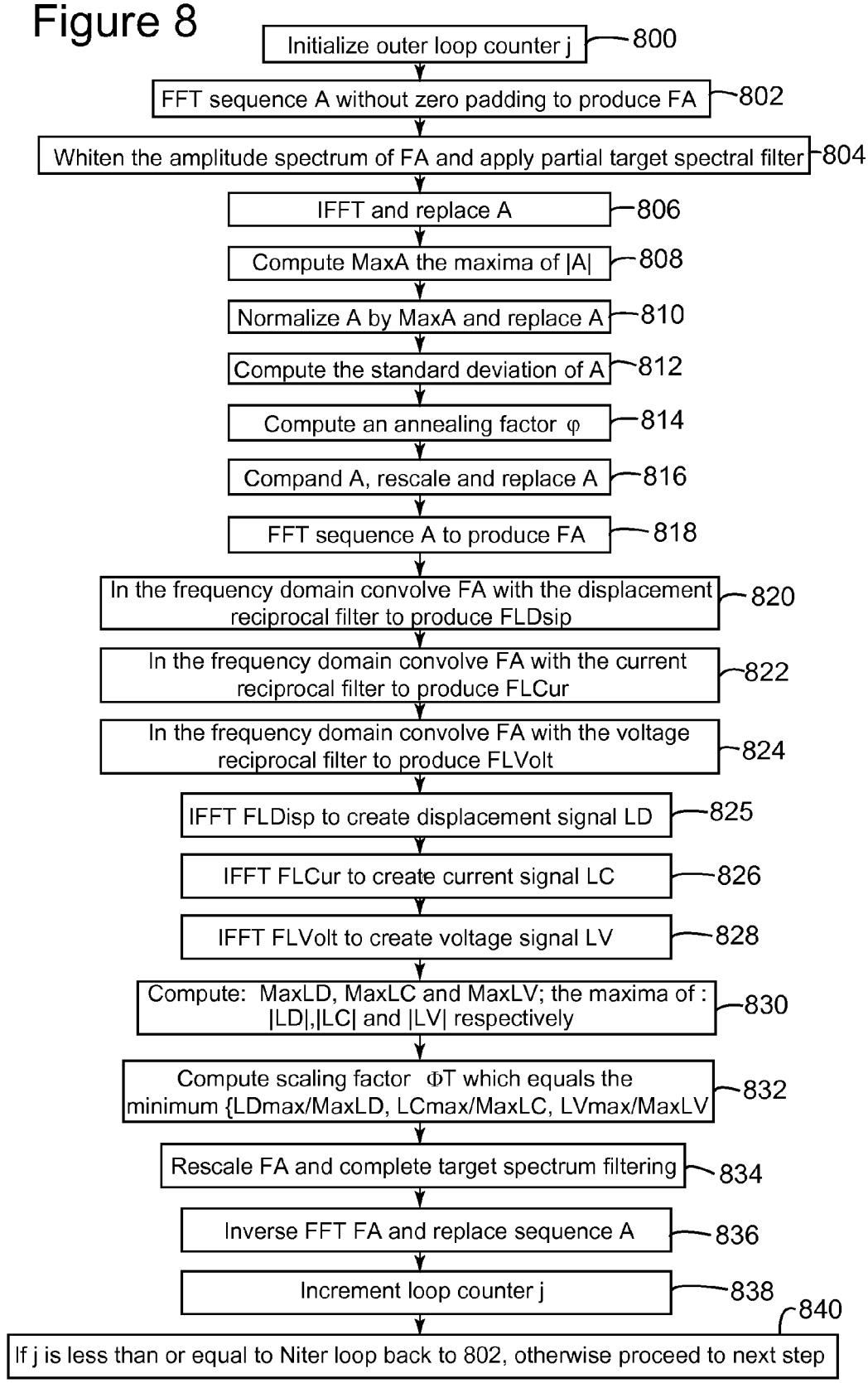
FIG. 8 is a flow chart of a method for determining continuous pseudorandom excitation signals for a low frequency vibratory source according to an exemplary embodiment.
Figure 9:
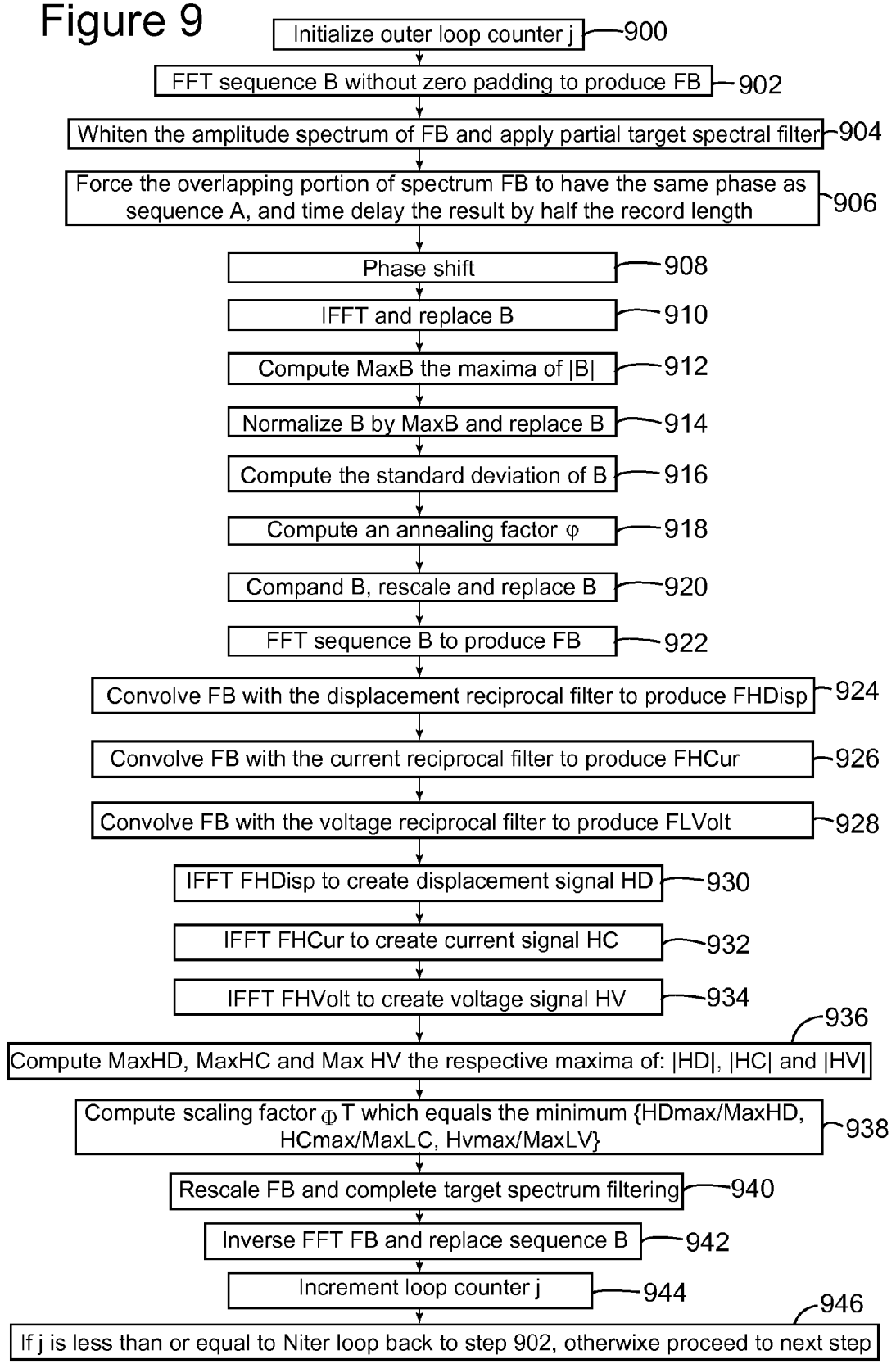
FIG. 9 is a flow chart of a method for determining continuous pseudorandom excitation signals for a high frequency vibratory source according to an exemplary embodiment.

The steps 708 and 710 are now discussed in more detail with regard to FIGS. 8 and 9. With regard to FIG. 8, in step 800 an outer loop counter "j" is initialized. The sequence "A" is converted in step 802 to the frequency domain using, for example, a FFT to produce a vector "FA" of complex numbers at each discrete frequency with index "m." The number of elements in the complex matrix vector "FA" is equal to "NFFT." Because the algorithm works with real values and not complex sequences in time, only the positive frequencies need be computed so the number of points in the FFT will be approximately half and the number of points N in the sequences "A" and "B" will also be equal to "NFFT." In this respect, it can be appreciated that using only the positive frequencies will halve the number of computations thereby improving software efficiency.

In step 804, the amplitude spectrum may be smoothed to fill in any spectral notches and shaped in part to the desired LFV target spectrum 1101. Now, the amplitude spectrum and the autocorrelation of a signal are closely linked. One property to note is that a signal with a smooth continuous amplitude spectrum will tend to possess an autocorrelation with low side-lobe levels; thereby the signal does not create artifacts, which might be mistaken for seismic reflection events in a correlated record. Equation (11) shows how this is achieved for each frequency element.

Considering that the symbol "←" is interpreted as "becomes" or is "replaced by" where in a computer program "X←Y" would imply that the value assigned to memory location currently allocated for variable X is replaced by numerical value Y, equation (11) states that:

$$FA_m \leftarrow FA_m \cdot \frac{1}{|FA_m| + v} \cdot (TargetL_m)^{1-\mu} \quad (11)$$

for $m = 0 \ldots NFFT - 1$

In equation (11), the term represented by the Greek letter nu "v" is a small number, for example $10^{-8}$ multiplied by the standard deviation represented by the Greek letter sigma "σ" of "A" or "σA" to avoid problems of division by zero. Thus, for each discrete frequency indexed on "m," a spectral division of "$FA_m$" by its magnitude "$|FA_m|$" is performed to yield a flat amplitude spectrum, while preserving the original phase spectrum. This whitened sequence is then multiplied by a digital version of the LFV target spectrum 1001, called TargetL$_m$, raised to a fractional power of (1-μ) where in this case "μ" was chosen to be 0.3. Thus, the target spectrum is only partially applied.

The vector "FA" is then replaced after this adjustment. The vector "FA" is IFFT in step 806, back to the time domain and the result of this step replaces the vector "A" containing the LFV source signal undergoing modification. Steps 808 through 812 compute some statistics to normalize sequence "A" before it is companded. In particular, the peak magnitude of "A" called "MaxA" is used to normalize "A" after which the standard deviation ("σA") of the normalized "A" is computed. In step 814 the annealing term "ρ" is computed, which adjusts how much the signal will be companded in step 816.

The annealing term is adjusted as shown below in equation (12) and will be close to unity in the first few loop iterations when "j" is small and then will decrease in value as "j" increases so that on the last loop iteration, when j=Niter, it will have a numeric value of zero.

Equation (12) is given by:

$$\varphi \leftarrow \left[1 - \left(\frac{j}{Niter}\right)^{2Niter}\right]^{\frac{1}{2\cdot Niter}}. \quad (12)$$

In step 816, a sequence "$A_k$," where "k" is the time index and "N" is the total number of samples in the digital version of "A," is further modified using a function called compand function as shown in equation (13):

$$A_k \leftarrow MaxA \cdot \left[\varphi \cdot compound\left(A_k \cdot \frac{\eta}{\sigma A}\right) + (1-\varphi) \cdot A1_k\right] \quad (13)$$

for $k = 0 \ldots N-1$, where compand(x)=sin $\{2x/\pi\}$, for $|x|<1$, and $=x/|x|$ elsewhere (14).

Thus, at the start of the iterative loop, the "compand( )" function has a strong effect and then in later loop iterations it has little effect and no effect on the last loop iteration. The "compand( )" function distorts the signal acting to compress values as they approach unity and amplify or expand values that are close to zero. Pseudorandom signals are notorious for having low RMS values for a given peak value. Thus, the compand function tends to increase the RMS content of the signal relative to its peak. The term "$\eta$" also determines how strongly the function "compand( )" acts. One example of this term is $\eta$=0.55.

It will be recognized that "compand( )" is a nonlinear function, so when it is applied to a pseudorandom signal, intermodulation noise product terms are produced, which will negate some of the spectral smoothing performed in the previous steps. Thus, by including the annealing term, the compand function is turned off in later iterations.

In steps 818 to 828 the constraint reciprocal filters (defined above in equations (2), (5) and (6)) are convolved with "A" in the frequency domain and then returned to time domain. The resultants are "LD," "LC" and "LV" corresponding respectively to the LFV piston displacement, current and voltage signal estimates. In step 830 the peak magnitude of each signal is computed, i.e., "MaxLD," "MaxLC" and "MaxLV." Then in step 832 a scaling factor "$\sigma T$" is computed which in effect equals the minimum of the ratios {LDmax/MaxLD, Lcmax/MaxLC, Lvmax/MaxLV}. The ratios represent how much headroom is left before a particular variable hits a system limit. Thus, the scaling factor "$\sigma T$" is applied in step 834 to rescale "FA" so that a system that is operated as close as possible to its limits without exceeding the limits is obtained. Also, in step 834 the remaining portion of the target spectral shaping function is applied based on equation (15):

$$FA_m \leftarrow \sigma T \cdot FA_m \cdot (TargetL_m)^\mu. \quad (15)$$

In step 836, "FA" is IFFT'd (inverse FFT transformed) to return it to the time domain and replace the matrix vector "A." In step 838, the loop counter is incremented and compared to a predetermined value "Niter," which represents the number of iterations the user has entered (in one example Niter=40). If the number of iterations is complete, the process exits this loop and proceeds to creating the HFV excitation signal explain now with regard to FIG. 9.

The processes defined in the HFV loop (step 710 in FIG. 7) includes steps 900 to 946, which for the most part are identical to the steps of the process used to form the LFV excitation signal. The differences between the steps of FIG. 8 and FIG. 9 are now discussed. The differences include: a HFV target spectrum is used, the performance limits for the HFV vibrator are applied, and the frequencies that lie over the frequency overlap interval (FOa, FOb) require special treatment. Equations (16) and (17) below show how the whitening process is handled for the HFV case. The FFT transformed version of sequence "B," where "B" is the pseudorandom sequence undergoing modification for use as the HFV excitation signal is the complex matrix vector "FB," where once again the discrete frequency index is "m." Equations (16) and (17) are given by:

$$FB_m \leftarrow FB_m \cdot \frac{1}{|FB_m|+v} \cdot (TargetH_m)^{1-\mu} \quad (16)$$

for $m = 0 \ldots NFFT-1$, and $$FB_m \leftarrow \frac{FA_m}{|FA_m|+10^{-30}} \cdot |FB_m| \cdot e^{\frac{-i\cdot\pi\cdot m}{2}} \quad (17)$$

only for $FOa < Hz_m < FOb$.

Comparing equation (11) to equation (16) above, it can be seen that the same whitening technique used before for the LFV signal is now used. However, in equation (17), for the frequencies that lie between frequency "FOa" and "FOb", the phase spectrum of "FB" is changed, where ("$Hz_m$") is the frequency in Hz corresponding to FFT frequency index "m". Further examining equation (17), the spectral division of "$FA_m$" by its magnitude "$|FA_m|$" (with a small number added to the denominator to stabilize matters) yields a matrix vector whose spectral elements are all of unit magnitude, but that have the same phase spectrum as signal "A" of the LFV excitation signal.

It is also apparent in equation (17) that the post multiplier term introduces a linear phase shift term to the sequence, the result being that the overlapping spectral components of sequence "B" are time shifted by a time corresponding to half the record length, and for this case by approximately 8.2 seconds, because the record length is considered to be about 16.4 s. Therefore, any crosstalk between signals "A" and "B" after circular correlation will be about +/−8.2 s from the zero lag term.

Figure 12A:
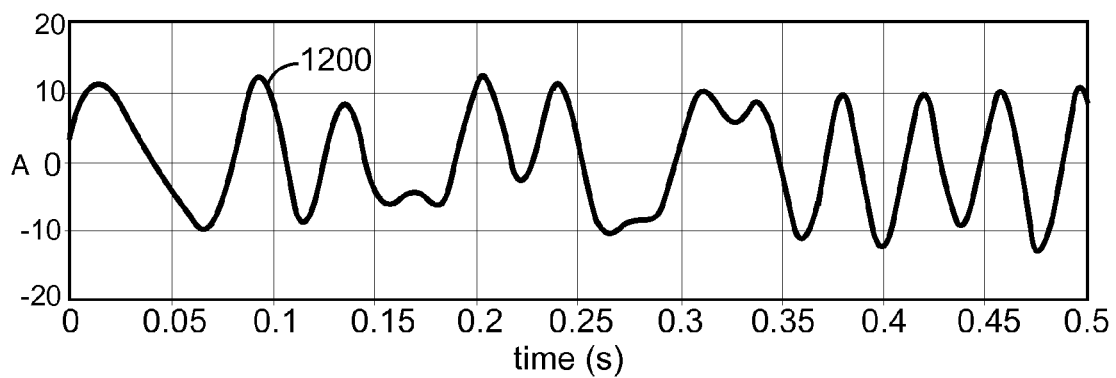
FIGS. 12A-B are an illustration of the final excitation sequences according to an exemplary embodiment.
Figure 12B:
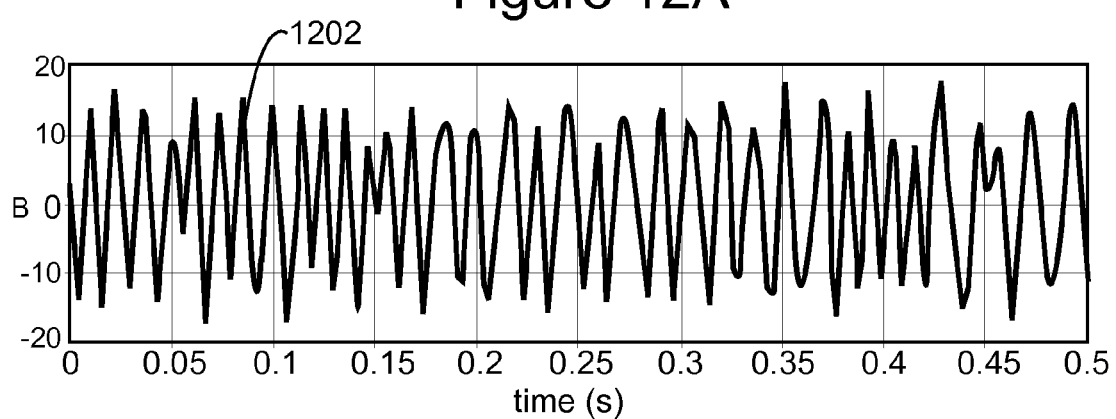
Figure 13A:
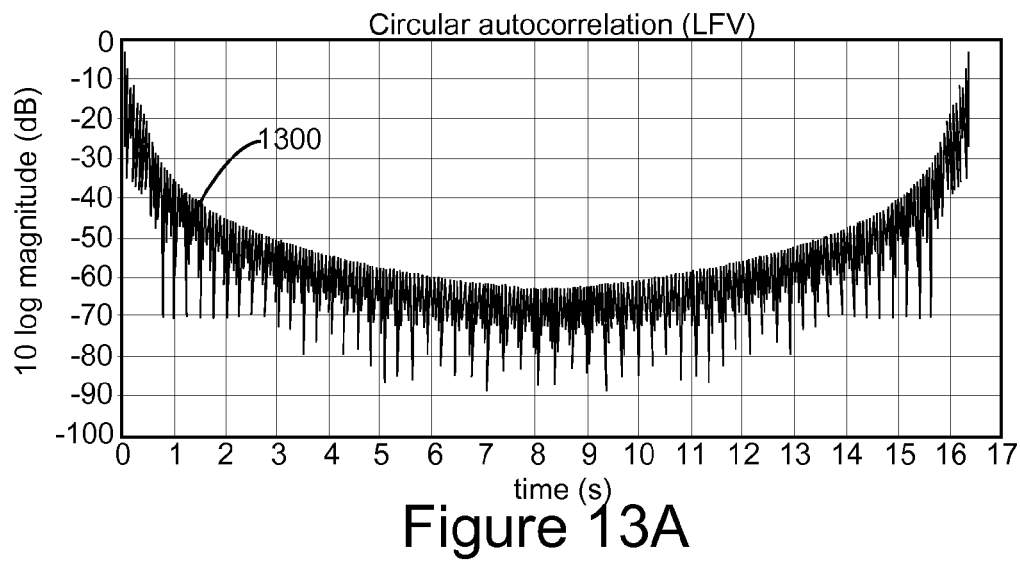
FIGS. 13A-C are auto- and cross-circular correlation magnitudes of the final excitation signals according to an exemplary embodiment.
Figure 13B:
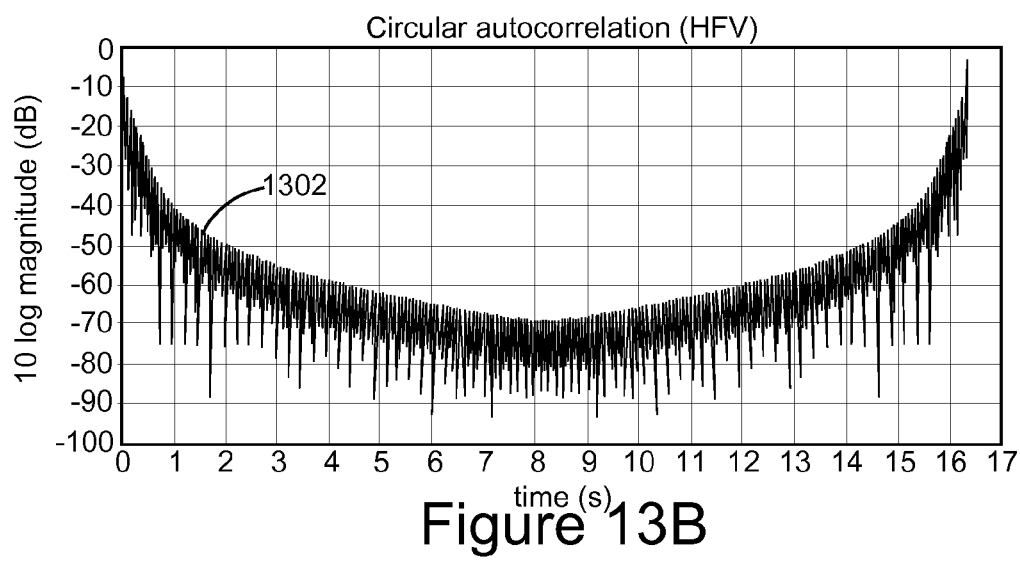
Figure 13C:
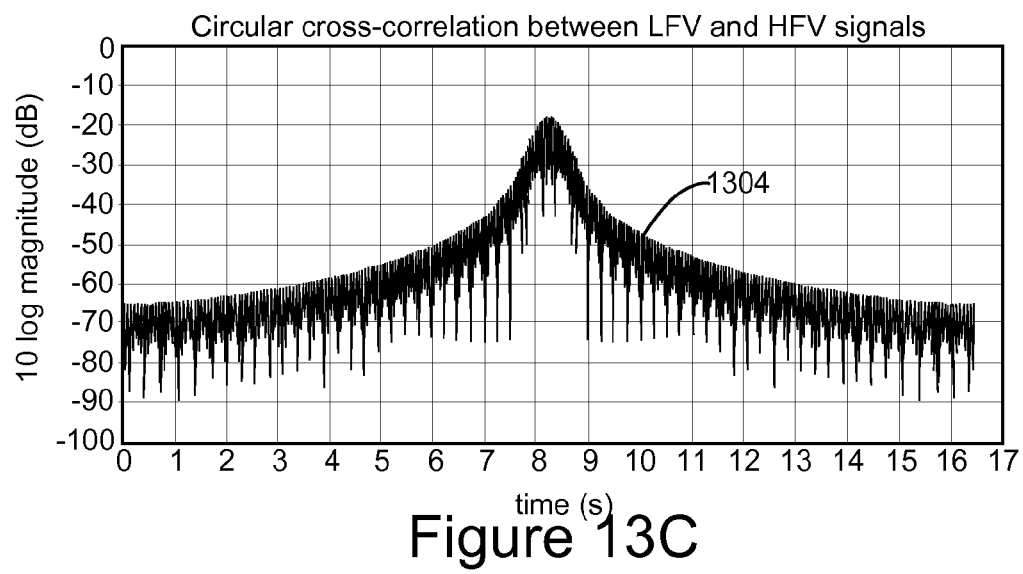

FIGS. 12A and 12B display the first 0.5 s of the final modified versions 1200 and 1202 of the excitation signals "A" and "B" for the LFV and HFV marine vibratory sources, respectively. Because these modified excitation signals were formed using a circular permutation and are band limited signals, they have the special property that if the sequences are repeated, the signal will appear to be continuous as it advances from the last point of the first sequence to the first point of the repeated sequence. Furthermore, if the sequence is repeated in continuum by concatenation, one can choose an arbitrary interval equal to the record length and that segment will retain the same power spectrum and same autocorrelation function as the originating sequence. FIGS. 13A-C display the circular autocorrelation of LFV excitation signal 1300 and HFV excitation signal 1302. Note that the length of the autocorrelation corresponds to the original record length of approximately 16.4 s.

These are displays normalized to the zero lag peak value and display the autocorrelation absolute value on a dB scale ($10 \log_{10}(| \ |)$). The circular cross-correlation between the LFV and HFV excitation signals is shown in FIG. 13C. The cross-correlation is displayed on a dB scale that has been normalized to the geometric mean of the autocorrelation peaks for the LFV and HFV excitation signals. Note that the cross-correlation is more that 50 dB down over the intervals 0-6.4 s and over the interval of 10-16.4 s. This ensures that any significant cross-talk will be displaced temporally by more that ±6.4 s from any reflection event that might be recorded after correlation.

In another exemplary embodiment, an optional step may be used to convert the resultant source excitation signals into a format compatible with the algorithms installed in the vibrator control electronics 501. In particular, if the time sample interval, (e.g., 2 ms sample interval for the case illustrated in the figures) is longer then the sample interval of the vibrator control algorithm (for example, 0.5 ms sample rate), the excitation signals can be resampled at a higher rate (2 kHz rate) through the use of an interpolation filter to produce equivalent, but compatible source excitation signals.

It will be noted that although the method of creating two excitation sequences is show, if one chooses to partition the seismic frequency band differently among three or more sources, an extension of the method to any number of sources can be accommodated. Furthermore, it will be noted that if only one source depth is employed, the need for spectral portioning is not needed; however, steps taken to increase source amplitude subject to system constraints can be used. Crosstalk due to spectral overlap between the sources could be mitigated in a similar fashion. Furthermore, the novel algorithm may be applied to an embodiment which includes a second suite of sources comprised of marine vibrators deployed at different depths, that are either towed by the same vessel as the first suite of sources or by a second vessel. In this case, both suites of sources are simultaneously energized and data is received into a common receiver or streamer. Thus, a different set of excitation signals can be designed for the second suite of sources so that the new set of excitation signals is weakly correlated with the first set of excitation signals, enabling data to be simultaneously acquired at two different source offsets to produce a combined record that could be separated during processing.

Figure 14:
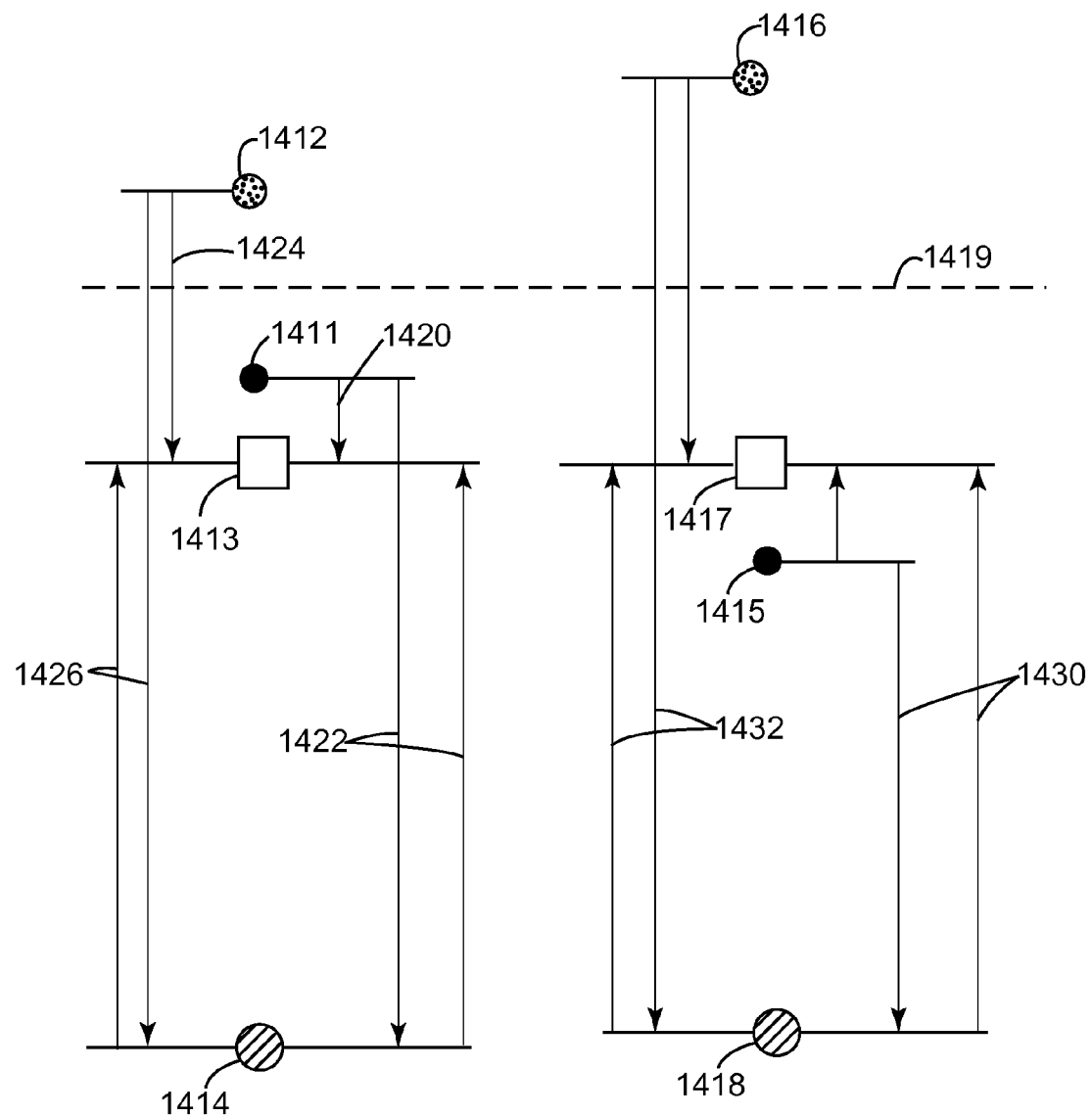
FIG. 14 is a schematic diagram of a simple acoustic model illustrating direct arrival, surface ghost and subsurface reflection ray paths according to an exemplary embodiment.

A method for separating the source contributions is now discussed. It is noted that this is an exemplary embodiment and other methods may be used to separate the source contributions. In this regard, FIG. 14 illustrates possible multiple pathways source acoustic emissions that travel from the sources to the receivers. For this simple example, only vertically propagating energy is considered. For the HFV source 1411 (e.g., located at a depth of 5 m), there is a short direct arrival 1420 from the source 1411 to the receiver 1413, there is a path 1422 from the HFV source 1411 to a subsurface interface 1414 (that reflects energy back toward the surface) and to the receiver 1413. There is also an HFV source surface ghost 1424, represented by a notional source 1412, which is located 5 m above the water surface (an amount equal to the source depth). Because the reflection coefficient at the surface 1419 between the water and the air is essentially −1, the notional source 1412 has the same strength as the source 1411, but is of opposite polarity. Another shown path 1426 corresponds to a reflection of a ghost from the interface 1414. Other ray paths are possible, for example, a receiver ghost or other secondary events that are multiples of the primary pathways. However, these additional paths are not shown for simplicity.

For purposes of illustration, a portion of a continuous record will be synthesized that includes a simple acoustic model. The simple acoustic model includes synthetic measured output source signals that are noise free (are identical to their respective excitation signals) and a composite receiver signal that is the sum of both LFV and HFV contributions. The simulation includes only ray paths 1422 corresponding to subsurface primary reflector 1414 and its corresponding surface ghost 1426. Likewise, ray paths 1430 corresponding to subsurface primary reflector 1418 and its corresponding surface ghost 1432 (corresponding to the second source 1415) are included.

Furthermore, receivers 1413 and 1417 are assumed to be a common hydrophone and they share a common reflector 1414 and 1418 that has a positive reflection coefficient. In this simple model, the earth impulse response is to be a combination of delayed spikes whose delay times correspond to the travel times of the acoustic energy to the receiver following the defined ray paths. The two-way travel time from the LHV source 1415 to the subsurface reflector 1418 to the hydrophone 1417 is 4 s. The arrival time for the other ray paths shown in FIG. 14 will be different due to the difference in the LFV and HFV depths (20 m vs. 5 m) with the speed of sound in the seawater assumed to be around 1500 m/s. For simplicity and to illustrate how signals created by the HFV and LFV sources can be separated, it is assumed that hydrophones 1413 and 1417 define the same receiver.

Note that a moving vessel tows sources and receivers, typically at a rate of about 2 m/s, so the depth of reflection events may change during the record length because subsurface acoustic interfaces are not strictly horizontal. The movement of the source and receiver may create signal distortions if the record length is long. Because of the multiplicity of the receivers, simple schemes can be employed to combine signals of adjacent receivers to create in effect a "stationary receiver" in later processing steps. Corrections for source motion can be made in processing too, see for example U.S. Pat. No. 6,049,507. However, such corrections are outside of the scope of this invention. Corrections for these distortions can be applied in processing steps that follow the source separation process. Thus, for the simple example described in FIG. 14, the effects of source motion are not included.

Figure 15:
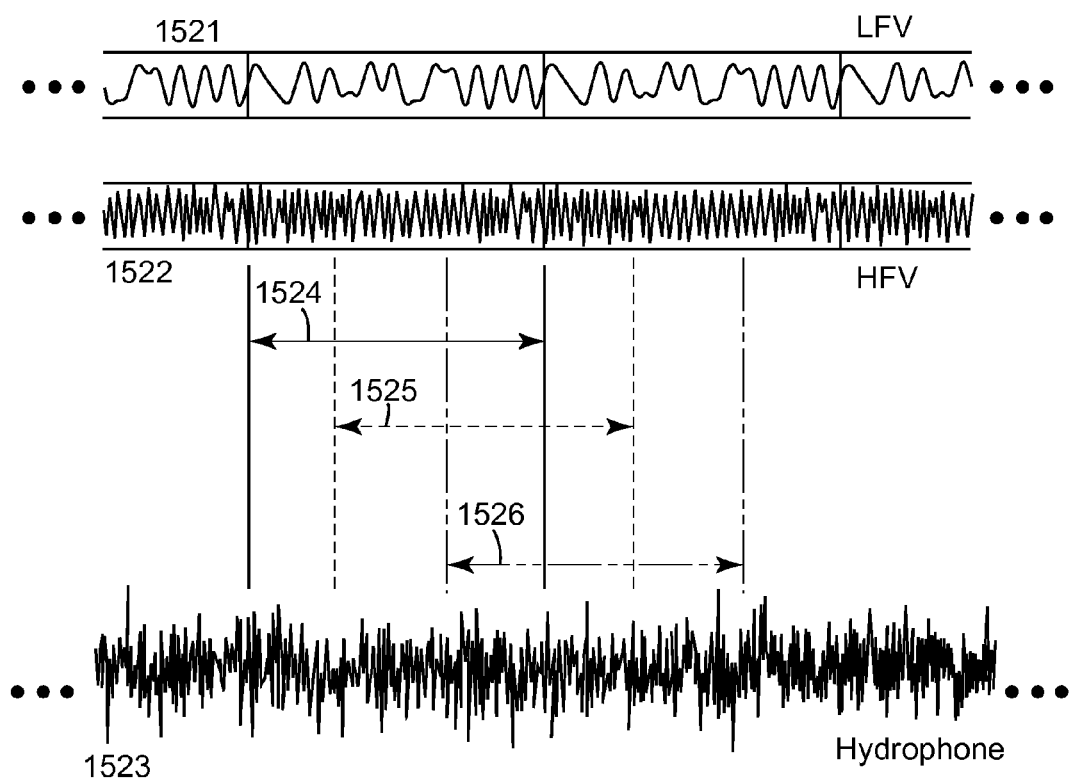
FIG. 15 illustrates the parsing of acquired continuous data record according to an exemplary embodiment.

The synthesized record is shown in FIG. 15 and includes a few data channel traces. The record includes (i) the repeated LFV source excitation signal 1521, (ii) the repeated HFV signal 1522 and (iii) the hydrophone signal 1523 (which is a composite signal comprised of the superposition of the LFV and HFV source emissions each convolved with their respective earth impulse responses). In a typical seismic survey, there may be hundreds or even thousands of recorded data channels, primarily hydrophone signal traces. The measured source output signals, for example piston acceleration signals, are not shown in FIG. 15, but for a well-controlled source they should closely resemble signals 1521 and 1522.

Figure 16:
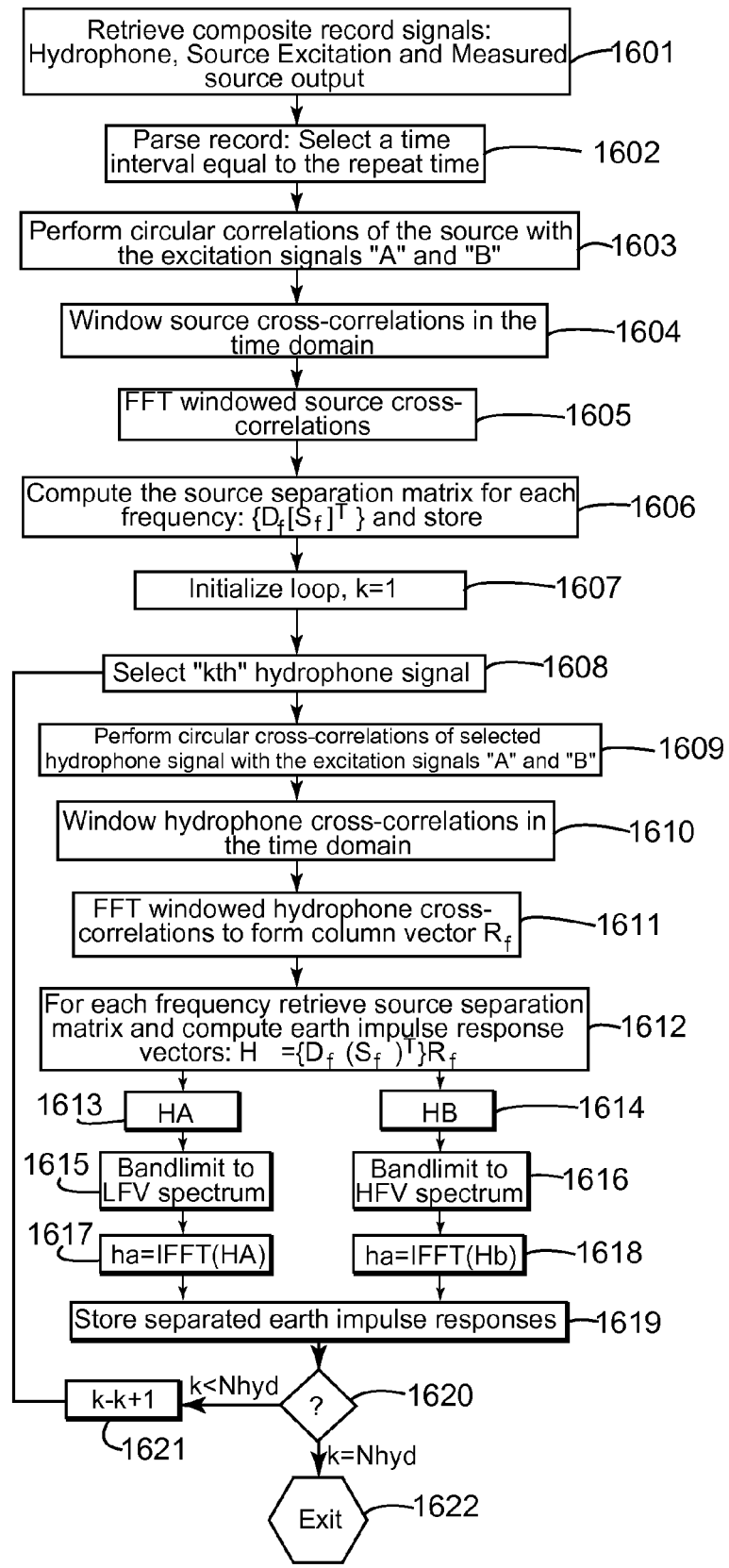
FIG. 16 is a flow chart illustrating a method for separating the combined record according to an exemplary embodiment.

The separation method is now discussed with regard to FIG. 16. Prior to discussing the separation method, the problem to be solved by this method is restated. The receivers record seismic signals that are originated at, for example, first and second vibratory seismic sources. As the sources send the seismic waves into the earth simultaneously and continuously, the resultant seismic signals are mixed when recorded by each receiver. In order to generate an image of the surveyed subsurface, the recorded signals need to separated, i.e., disentangled. The novel separation method next discussed achieves this objective. The method is based, in part, upon an optimal least square filter solution (Weiner-Kolmogorov filter) in the presence of white noise applied in the frequency domain. In one application, the separation process can be executed onboard the vessel using the data acquisition system illustrated in FIG. 4 through execution of a computer program on the processing unit 405 with access to the acquired seismic survey data stored in the memory of the data storage unit 404 or at another location, for example in an onshore processing center that has a copy of the acquired seismic survey data.

The continuous record illustrated in FIG. 15 is selected in step 1601. The data selected in step 1601 may include hydrophone data "d", the excitation signals A and B, and an output of the sources, measured, for example, by sensors 514 to 517. In step 1602, the continuous record is parsed into smaller composite records, each of duration equal to the pre-determined record length for which the pseudorandom sequences were designed. For example, one choice might be to select segment 1524 whose time duration would be about 16.4 s. In subsequent steps, this composite record will be separated to provide an earth impulse response from the sources to the various receivers (for example the one corresponding to signal 1523). These separated composite records are in essence "shot records" that represent a collection of earth responses from the separated source to each hydrophone. Other composite records can be selected which may in part overlap segment 1524, for example 1525 or 1526 that are each of duration of about 16.4 s for this example. Each of these composite records can be separated to produce a shot record, comprised of many received signals, that represents the average impulse response (due to motion) of the earth from a known or calculable source position to the various, known or calculable, receiver positions selected.

Because a moving vessel tows many receivers, each shot record is recorded as a function, not only with respect to time, but also space. Thus, in later processing steps beyond the scope of this invention, a receiver motion correction may be applied to create a virtual stationary receiver whose location will be at the midpoint of the path the receiver has followed during the record length time interval. Likewise, a correction may be made for source motion to create a virtual stationary source located typically at the midpoint of its trajectory during the record length time interval. An implication of all of these corrections is that by changing the starting position of each parsing segment relative to the start of the next parsing segment, for example, the time between the start of segment 1524 and 1525, it is possible to vary the survey spatial sampling interval, thereby providing a higher trace density that can be useful in subsequent processing steps.

Because the pseudorandom signals emitted by the sources exhibit a fairly constant spectral content throughout the record length, subsurface features are uniformly illuminated throughout the record length. For sources that use conventional chirps or swept sine waves this will not be the case, because as the source moves during the record, different features may receive different spectral illumination. The channels in the parsed record are then cross-correlated in step 1603 with the parsed version of excitation signals "A" and "B". Depending upon the starting position of the combined record, the parsed versions of "A" and "B" will in effect just be time-delayed versions of the original codes that are wrapped around. In one exemplary embodiment, the circular correlation is performed in the frequency domain. Thus, an FFT of the various channels in the composite record may be performed. The frequency domain representation of the source measured signals and all the receiver signals is then multiplied, frequency by frequency, by the complex conjugate of the frequency domain representation of the source excitation signals "A" and "B". The resulting frequency domain cross-correlation signals are IFFT'd to take the signals back to time domain.

Figure 17A:
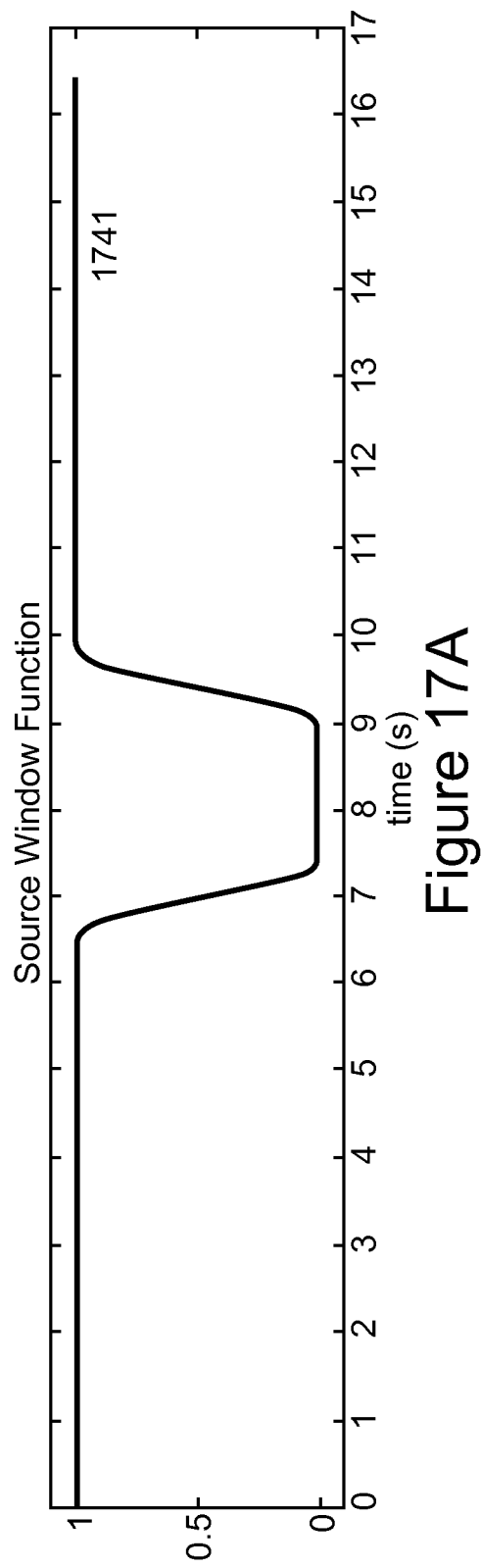
FIGS. 17A-B illustrates source and receiver window function employed in a separation process according to an exemplary embodiment.
Figure 17B:
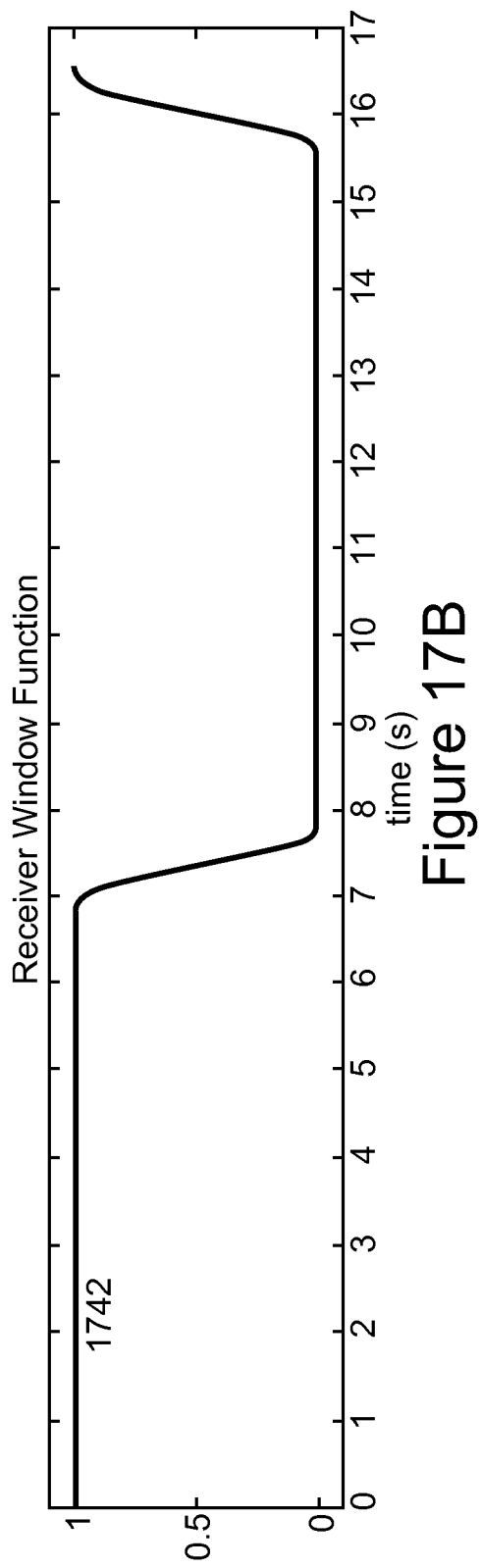

In step 1604, the parsed measured source output signals (piston accelerations) that have each been cross-correlated with the parsed versions of excitation signals "A" and "B", are windowed in the time domain, using a source window function like 1741 as illustrated in FIG. 17. The source window function 1741 is centered about the zero lag (time=0 s), and wraps around. The source window in this embodiment is of a length equal to about 90% (about 14.8 s) of the record length (about 16.4 s), and follows a cosine taper function. The start and end window taper is about 5% of the window length for each. A smooth transition is implemented from the region where the window is full "ON" and assumes a value of unity and where the window is "OFF" and assumes a zero value. The smooth transition is desired to avoid introduction of processing artifacts. The "OFF" portion of the window corresponds to the time lag where the cross-talk between the sources due to common frequency emissions was pushed in the excitation signal creation process defined in the previous section. The windowing operation is merely the product of the source cross-correlation signal and the source window function time sample by time sample.

For example, the "$k^{th}$" sample of a source cross-correlation signal is multiplied by the "$k^{th}$" sample of the window function. After windowing, the result is called the windowed source cross-correlation signal. Thus, for the present example, with two source excitation signals ("A" and "B") and two measured source output signals "U" (LFV piston acceleration) and "V" (HFV piston acceleration), there will be four windowed source cross-correlation signals: "rUA", "rUB", "rVA" and "rVB", where, for example, "rUA" corresponds to the windowed cross-correlation of source output "U" correlated with excitation signal "A", and "rUA" is a matrix vector with each element corresponding to a discrete time lag. Signal "U" may be a combination of the two piston acceleration signals as sensed by 514 and 515, for example, a sum of the two piston acceleration signals. The same is true for the HFV measured source output signal, where if, for example, a twin driver design were used, "V" would actually be a combination of its measured piston accelerations.

In step 1605 an FFT for each matrix vector "rUA", "rUB", "rVA" and "rVB" is taken to produce their frequency domain representations, which are matrix vectors: "FRUA", "FRUB", "FRVA" and "FRVB", where the element of each vector corresponds to a discrete frequency value with index "f". Still in the frequency domain, the elements of "FRUA", "FRUB", "FRVA" and "FRVB" are used to form in step 1606 a source separation matrix that will be applied later, frequency by frequency to calculate the earth impulse response. The source separation matrix is given by "$\{D_f(\overline{S_f})^T\}$" which is actually a product of two matrices. The superscript "$T$" denotes the matrix transpose operator and the bar above $S_f$ denotes the complex conjugation of the off-diagonal elements (with no swapping of the diagonal elements). The matrices "$D_f$" and "$S_f$" are defined as follows:

$$S_f := \begin{pmatrix} FRUA_f & FRVA_f \\ FRUB_f & FRVB_f \end{pmatrix} \quad (18)$$

and $$D_f := [(\overline{S_f})^T \cdot S_f + \gamma \cdot I]^{-1} \quad (19)$$

where I is the identity matrix, which is given by:

$$I := \begin{pmatrix} 1 & 0 \\ 0 & 1 \end{pmatrix}, \quad (20)$$

$$\gamma := 10^{-4} \cdot mFRUA \cdot mFRVB, \quad (21)$$

$$mFRUA := \max(|FRUA|), \text{ and} \quad (22)$$

$$mFRVB := \max(|FRVB|). \quad (23)$$

In equations (22) and (23), the terms: "max(|FRUA|)" and "max(|FRVB|)" are to be understood to mean the magnitude maxima over all frequencies of interest of complex valued matrix "FRUA" and "FRVB" respectively. The number "γ" is a small number used to stabilize the matrix inversion operation performed in equation (19) and this is sometimes referred to as the white noise term. Because in this example only two sources are used, the matrices "D", "S" and "I" are all 2×2 square matrices. However, if more sources are used, for example, another one operating over a different band of frequencies, so that 3 sources are used, then these matrices will become 3×3 in size.

The source separation matrix values corresponding to each discrete frequency indexed by "f" are stored for later application after they are each computed in step 1606.

Next, in step 1607, a loop index "k" is initialized. The index "k" corresponds to the receiver trace index because the composite record includes a plurality of hydrophone signals d corresponding to the received signal measured at the position it occupied in the streamer. In step 1608, the hydrophone signal $d_k$ corresponding to k is retrieved from the computer memory, for example, the data acquisition system data storage unit 404.

In step 1609, the selected hydrophone signal $d_k$ is cross-correlated with each of the parsed versions of excitation signals "A" and "B". In one application, the correlation is performed in the frequency domain to realize a circular correlation process. The hydrophone circular cross-correlated signals are windowed in step 1610 in the time domain using the receiver window function 1742 that is displayed in FIG. 17B. The receiver window function 1742 is centered about the time lag corresponding to the midpoint of the listen time (3.5 s); in this example, the listen time was 7 s, to record reflection events that had two-way travel times that were less than 7 s. The receiver window operator is designed to have a total length equal to about 1.2 times the listen time (8.4 s for this example).

Like the source window function 1741, a cosine taper window is used that has a smooth transition from zero to unity. It is noted that the full amplitude portion of the receiver window is equal to the listen time and is positioned so that the receiver window function is of value one over the time lag interval of zero to listen time; i.e. 0 to 7 s for this example. The tapers that correspond to the level transition regions are each of duration equal to 10% of the listen time, in this example (0.7 s). Other values may be used.

Figure 18A:
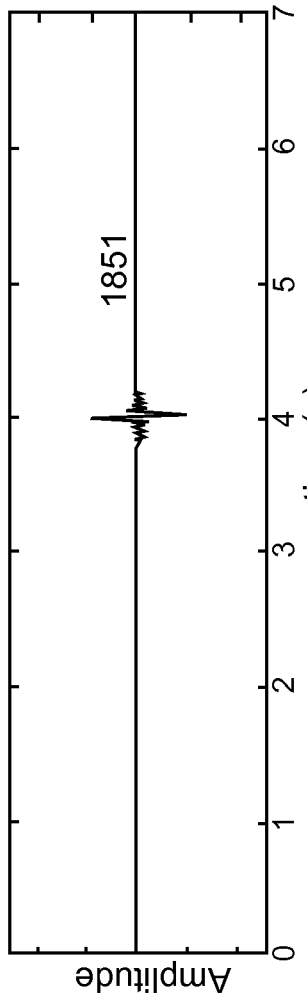
FIGS. 18A-D illustrate wavelets resulting from the cross-correlation of the receiver data with source excitation signals according to an exemplary embodiment.
Figure 18B:
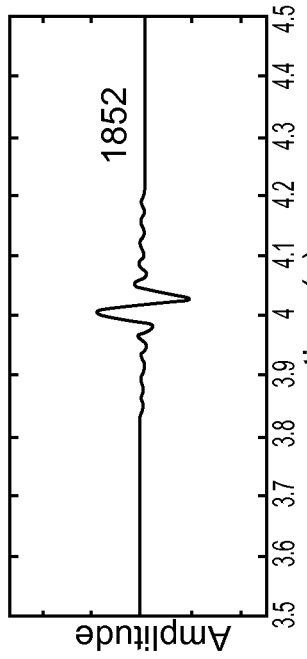
Figure 18C:
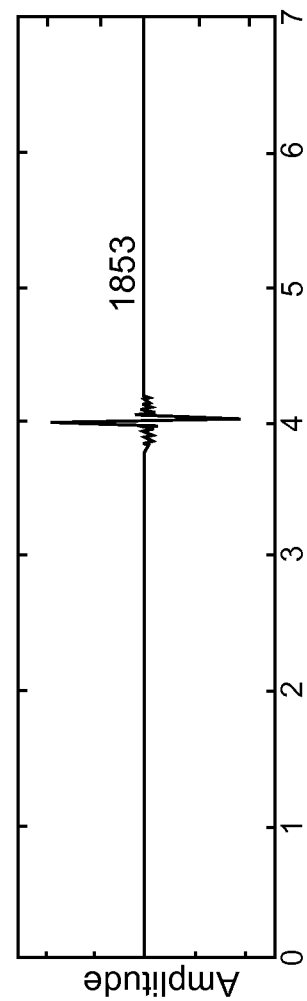
Figure 18D:
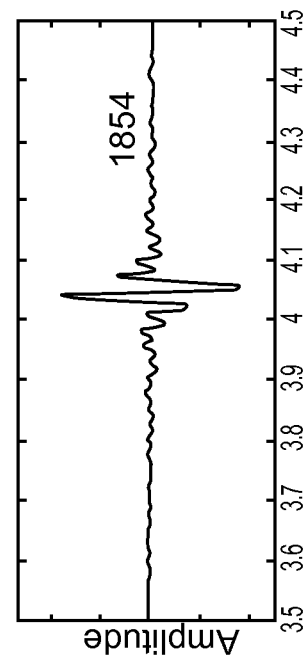

The windowing process is a product between the hydrophone cross-correlation signals and the corresponding receiver window function value at that same time lag. Various wavelets are shown in FIGS. 18A-D of the windowed hydrophone cross-correlation. Wavelet 1851, illustrated in FIG. 18A, includes the result of the correlation of the hydrophone signal with the parsed excitation signal "A" displayed over the listen time interval (0, 7 s). FIG. 18B illustrates an enlarged view 1852 of that same wavelet 1851. FIG. 18C illustrates a wavelet 1853 corresponding to the circular cross-correlation of the selected hydrophone signal and the parsed excitation signal "B" displayed over the listen time interval with a corresponding enlarged view 1854 of that same wavelet illustrated in FIG. 18D.

Both wavelets 1852 and 1854 do not appear to be zero phase wavelets as one might expect for a simple reflection off an interface having a positive reflection coefficient. This is so because of the source ghost effect. In conventional Vibroseis acquisition, correlation is typically used to compress the data to produce records that resemble records produced using impulsive sources like air guns, and this intermediate result may be sufficient in some applications without including the usage of source output signatures to produce source signature deconvolved data.

However, there are some advantages by performing a separation procedure that includes their use. For example, if the sources have some nonlinear mechanism present in their operation, this will give rise to intermodulation distortion (IMD) that may create cross-talk artifacts that occur within the listen time. Application of the matrix source separation technique based upon measured source output signals (for example piston acceleration) will tend to mitigate these problems. Furthermore a simple correlation is not a true representation of the earth impulse response since it is colored by the source output spectrum. Thus, changes in source control performance that might occur over time may lead to false readings if not accounted for in other ways.

Advancing to step 1611, the windowed hydrophone correlograms (wavelets) are converted to the frequency domain through application of an FFT. The frequency domain representations of the hydrophone correlograms are given by matrix vectors "FRHA" and "FRHB." These matrix vectors correspond to the windowed hydrophone correlograms corresponding to the LFV and HFV sources, respectively. FRHA and FRHB each contain elements comprised of complex numbers that have a discrete frequency index "f". Thus, for each discrete frequency of the FFT, a matrix vector "$R_f$" can be constructed as follows:

$$R_f := \begin{pmatrix} FRHA_f \\ FRHB_f \end{pmatrix}. \qquad (24)$$

Continuing to step 1612, a matrix vector "$H_f$" that contains the separated earth impulse response ascribed to each source, "$HA_f$" for LFV and "$HB_f$" for HFV, evaluated at the discrete frequency with index "f" can be computed using the following equation:

$$H_f = \begin{bmatrix} HA_f \\ HB_f \end{bmatrix} = \{D_f(\overline{S_f})^T\}R_f. \qquad (25)$$

The separated frequency domain representations of earth impulse responses ("HA" calculated in step 1613 and "HB" calculated in step 1614) are each band limited in steps 1615 and 1616, respectively, to remove any spectral artifacts that might lie outside the respective source target amplitude spectra. For this example, elements of the vector "HA" whose frequency index lies outside the range corresponding to 2-32 Hz are muted (set to zero amplitude) and for vector "HB" values corresponding to frequencies outside of the range of 28-100 Hz are muted. The band limited responses are then converted back to time domain through application of the IFFT transform to yield 'ha' in step 1617 and 'hb' in step 1618, which are the separated time domain representations of the earth impulse response from the LFV source and the HFV source respectively to the "$k^{th}$" hydrophone. Based on the earth impulse responses in the time domain, the signals originating from the first vibratory seismic source are disentangled from signals originating from the second vibratory seismic source. In this example only two vibratory seismic sources have used for simplicity. It is noted that more than two vibratory seismic sources may be used and a similar method may be used to separate the seismic data.

The separated earth responses are stored in step 1619 in computer memory and a decision is made at step 1620. Step 1620 compares the current index against the last hydrophone index called "Nhyd". If the last hydrophone composite trace has been separated, then the program exits at step 1622. If there are more hydrophone composite traces remaining to be separated, the loop index k is incremented at step 1621 and the process is repeated for the next hydrophone signal starting at step 1608.

Figure 19B:
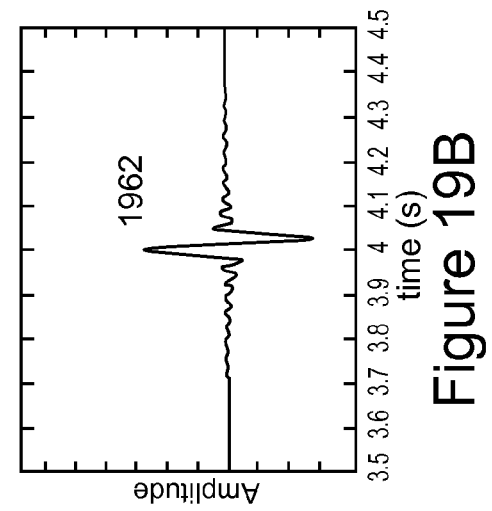
FIGS. 19A-D illustrate wavelets resulting from the source separation/signature deconvolution process according to an exemplary embodiment.
Figure 19D:
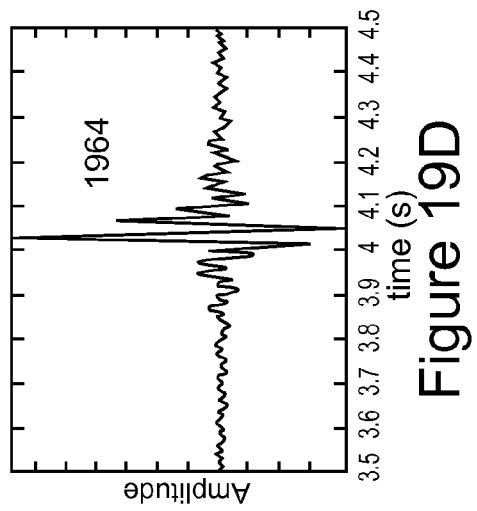
Figure 19A:
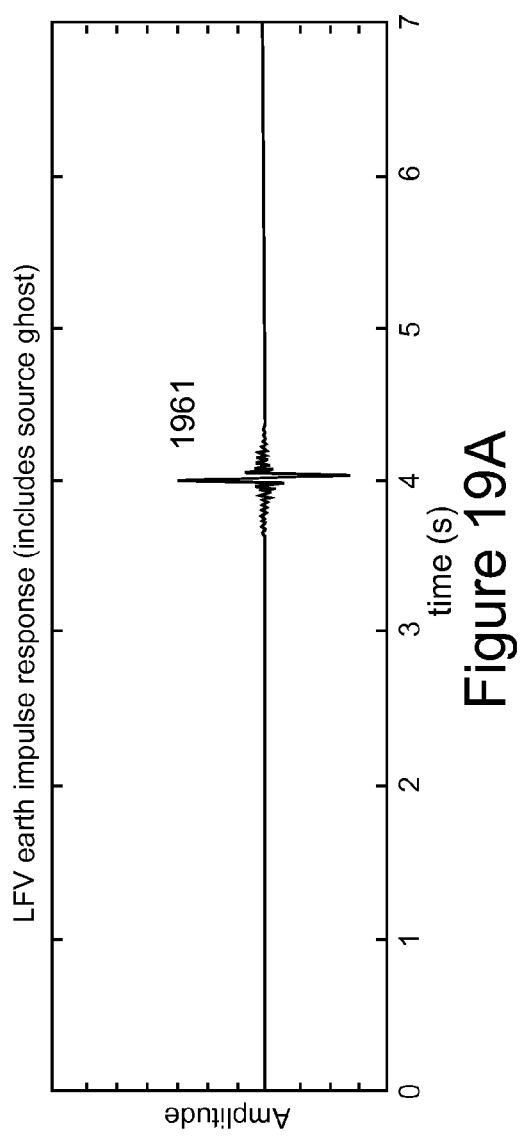
Figure 19C:
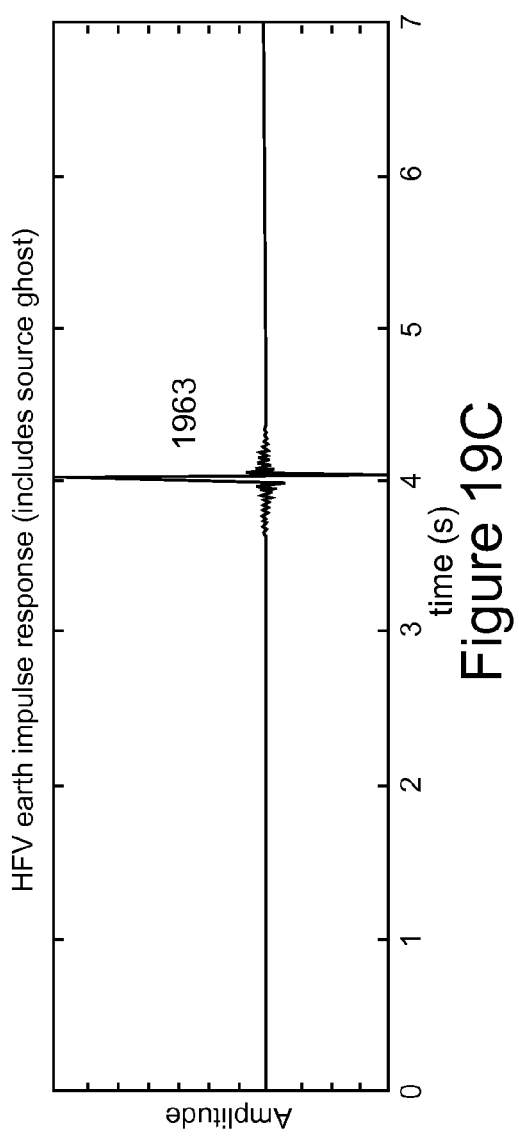

FIGS. 19A-D show the results of the synthetic composite hydrophone signal after undergoing the separation process described in FIG. 16. FIG. 19A shows a wavelet 1961 containing the separated earth impulse response corresponding to the LFV source and an enlarged view 1962 of this wavelet in FIG. 19B. Likewise, the separated earth impulse response corresponding to the HFV source is shown as wavelet 1963 in FIG. 19C with an enlarged view 1964 in FIG. 19D. As was the case for the correlograms 1852 and 1854, the earth impulse responses 1962 and 1964 are not simple zero-phase spikes because they still contain the contribution of the surface ghost reflection event along with the subsurface reflection event.

Figure 20B:
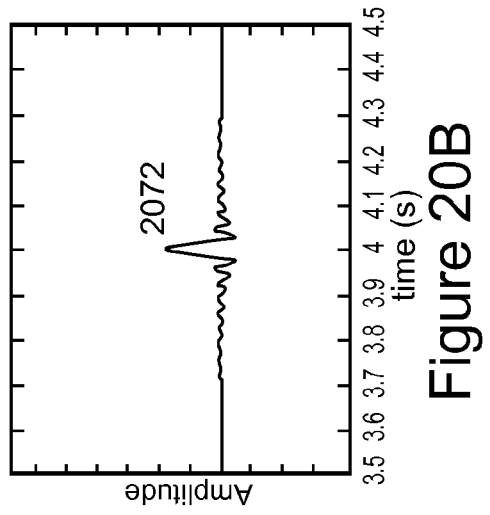
FIGS. 20A-D illustrate wavelets resulting from the source separation/signature deconvolution process after source ghost removal according to an exemplary embodiment.
Figure 20D:
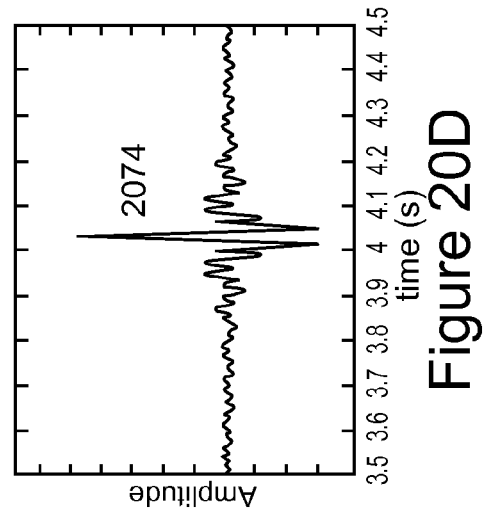
Figure 20A:
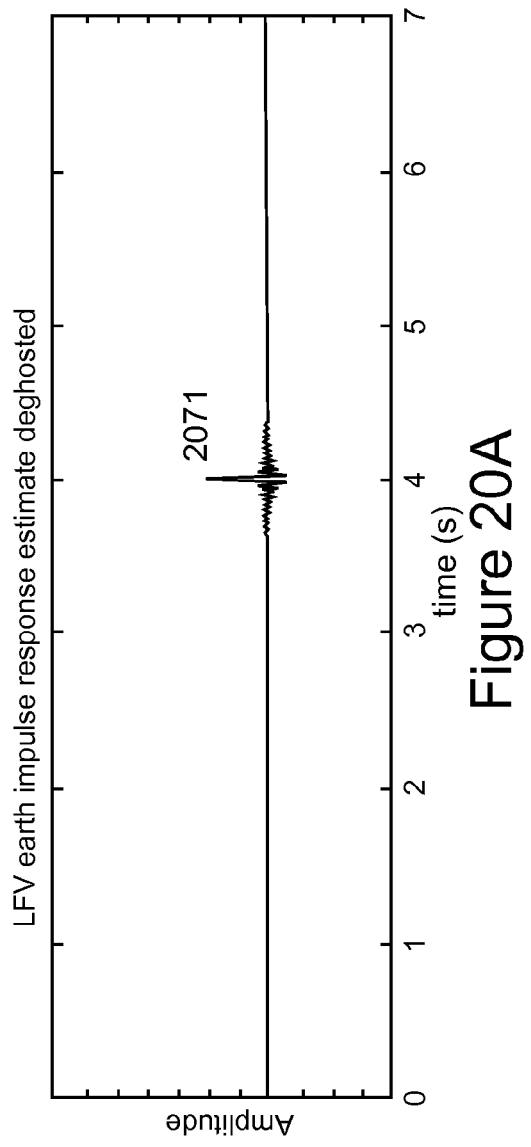
Figure 20C:
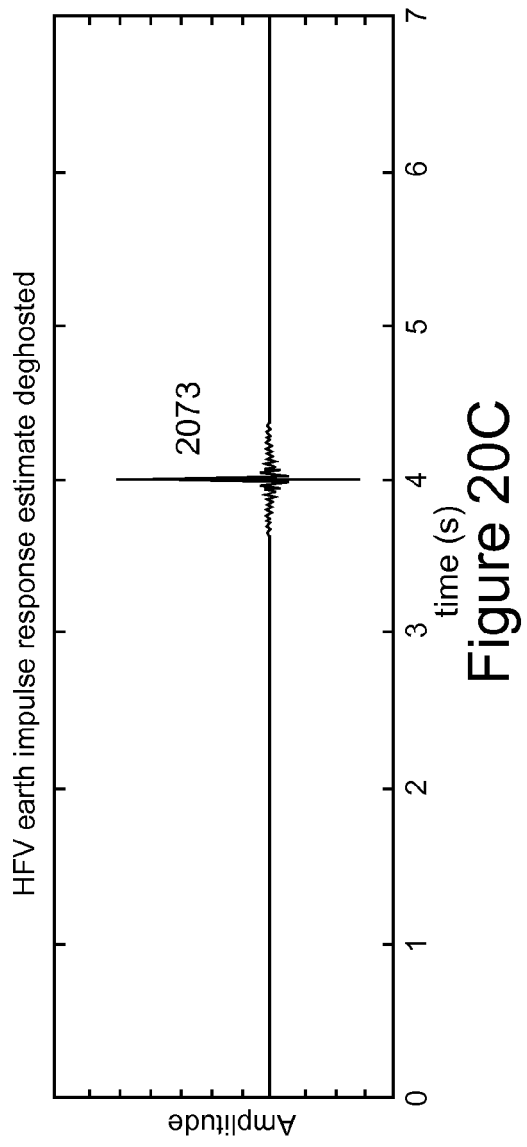

FIGS. 20A-D show the result after the surface ghost contribution has been removed. The surface ghost was removed using, for example, a simple deterministic model. Other models may be used. FIG. 20A shows the deghosted LFV earth impulse response 2071 and its enlargement 2072 is shown in FIG. 20B. FIG. 20C shows the deghosted reflection event 2073 and its enlargement 2074 is shown in FIG. 20C. After processing steps like correction for receiver motion, source motion and deghosting, steps that are outside the scope of this invention, the separated contributions 2071 and 2072 can be geometrically corrected (recall the sources are at different depths), shifted and combined to eventually produce a stacked record that has fully utilized the combined bandwidth of the LFV and HFV source.

It is noted that other embodiments of the disclosed continuous system may be implemented that are substantially the same as the above-noted embodiments. These alternate implementations may be hardware deployed or processes steps. For example, the LFV source may actually be comprised of multiple marine vibrators, like the one shown in FIG. 5. An output of the vibrator shown in FIG. 5 is controlled and synchronized to a first excitation signal. The same could hold true for the HFV source where multiple marine vibrators are slaved to a second excitation signal. In this situation, if the LFV source array overall dimensions are small compared to the emitted wavelengths, the average or a combination of the piston accelerations for the LFV source array could be used to form the source output measured signal called "U". The same would hold true for the HFV source array in which the average piston accelerations of all the marine vibrators in that array would be combined to form the source output measured signal called "V".

The described "U" and "V" signals could then be used in the separation process to compute the earth impulse response from the LHV source array and from the HFV source array. In a different embodiment, in which the LHV and HFV sources utilize different sized pistons, a weighting based upon piston surface area might be applied to the measured piston acceleration to convert their linear acceleration signal to a signal representative of the effective volumetric acceleration of each source and that signal could be used in place of "U" and "V" respectively, thereby eliminating the different coupling gain the different sources might have when computing the earth impulse responses. Another possible embodiment would be the case where the receivers are actually stationary, as might be the case when an OBC (ocean bottom cable) is used or when the receivers are autonomous nodes, for example Trilobit nodes manufactured by CGGVeritas that are deployed on the sea floor.

Figure 21:
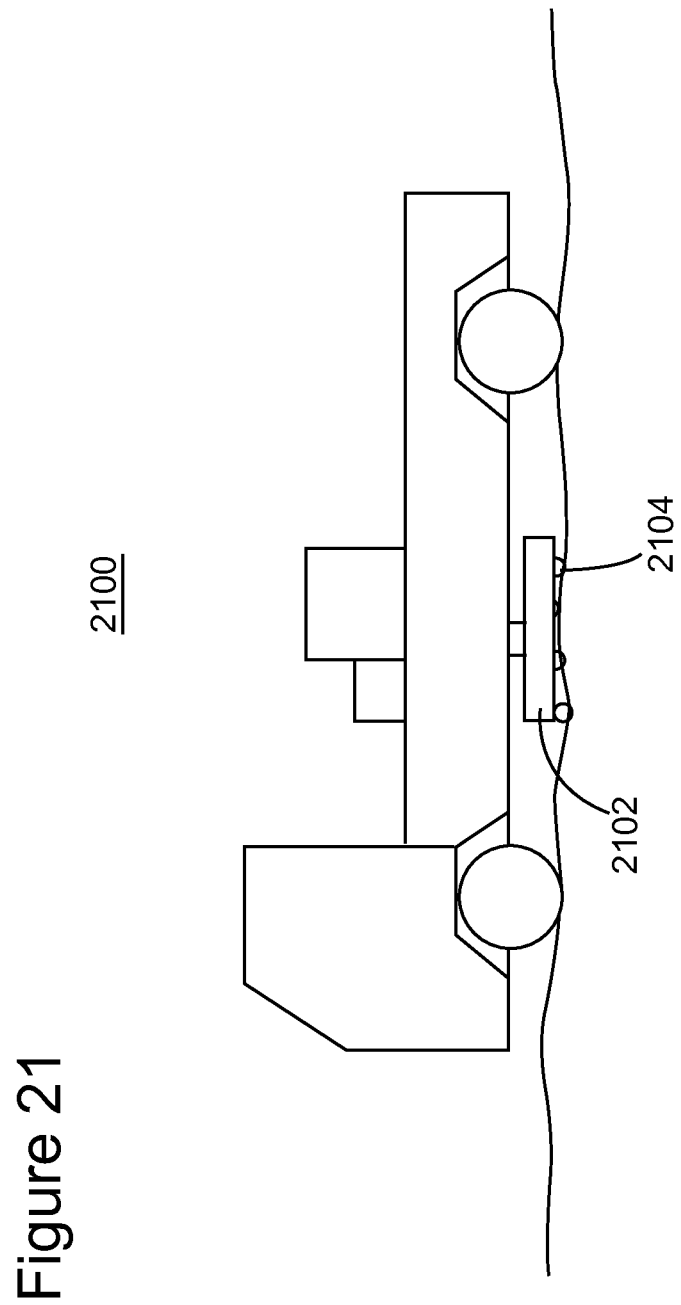
FIG. 21 illustrate a land vibratory source that may be configured to continuously sweep according to an exemplary embodiment.

Further, it is noted that the methods discussed above may be extended to land seismic sources. For this situation, the seismic source may be as illustrated in FIG. 21, i.e., a truck 2100 provided with a baseplate 2102. The baseplate 2102 has wheels 2102 (or other means) for staying in contact with the ground while the truck 2100 moves along an acquisition line so that the acoustic energy is continuously imparted to the ground.

Figure 22:
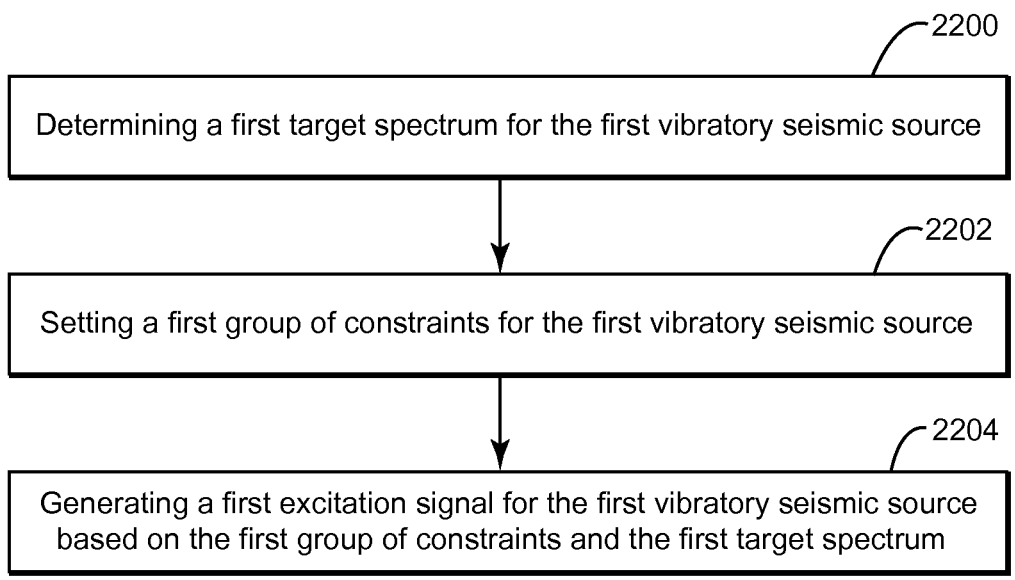
FIG. 22 is a flowchart of a method for generating an excitation signal for a vibratory seismic source so that the vibratory seismic source is driven with no listening time according to an exemplary embodiment.

A method for generating an excitation signal for a first vibratory seismic source so that the first vibratory seismic source is driven with no listening time may be implemented as discussed next. As illustrated in FIG. 22, the method includes a step 2200 of determining a first target spectrum for the first vibratory seismic source; a step 2202 of setting a first group of constraints for the first vibratory seismic source; and a step 2204 of generating a first excitation signal for the first vibratory seismic source based on the first group of constraints and the first target spectrum. First seismic traces recorded with plural receivers can be identified when the first vibratory seismic source is driven with no listening time, based on the first excitation signal.

Figure 23:
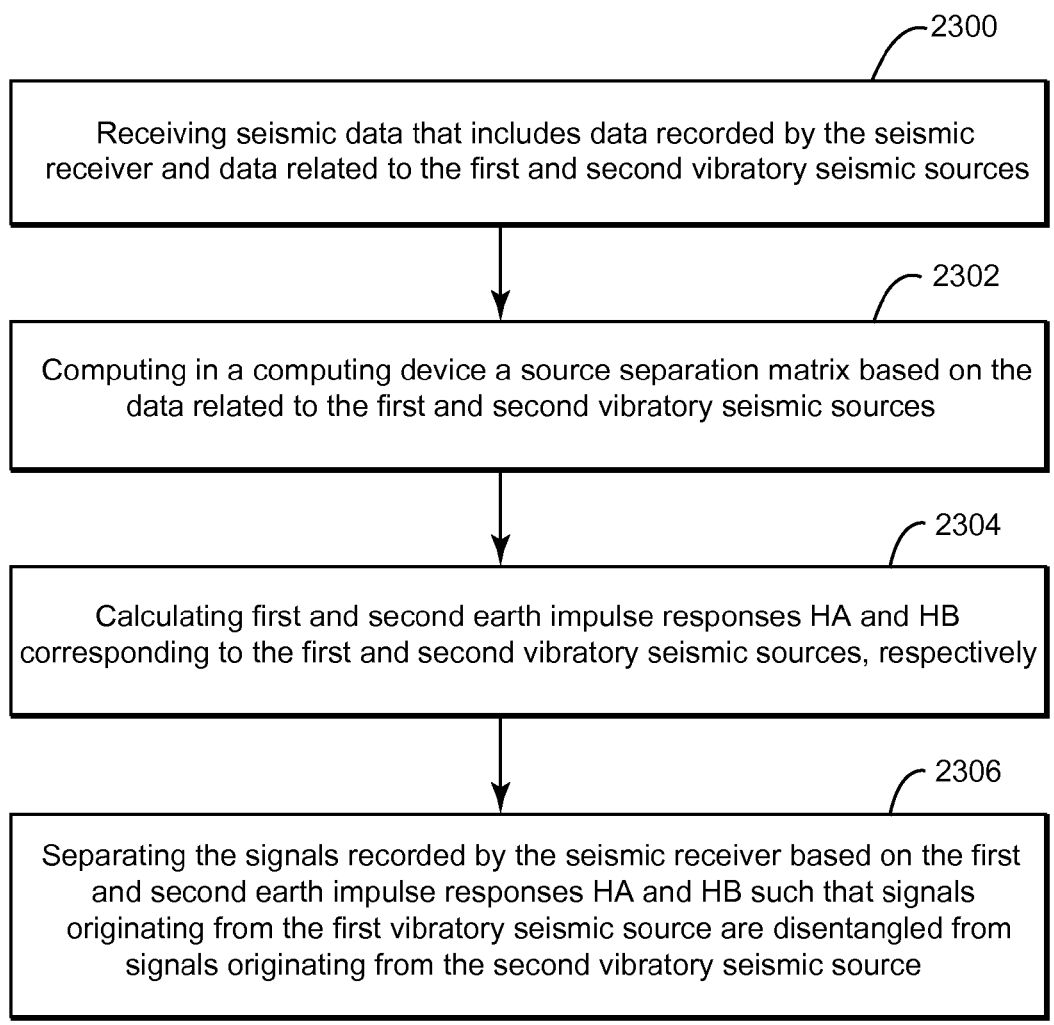
FIG. 23 if a flowchart of a method for separating signals recorded by a seismic receiver and generated with at least first and second vibratory seismic sources driven with no listening time, according to an exemplary embodiment.

A method for separating signals recorded by a seismic receiver and generated with at least first and second vibratory seismic sources driven with no listening time is now discussed. As illustrated in FIG. 23, the method includes a step 2300 of receiving seismic data that includes data d recorded by the seismic receiver and data related to the first and second vibratory seismic sources; a step 2302 of computing in a computing device a source separation matrix based on the data related to the first and second vibratory seismic sources; a step 2304 of calculating first and second earth impulse responses HA and HB corresponding to the first and second vibratory seismic sources, respectively, based on the data d recorded by the seismic receiver, the data related to the first and second vibratory seismic sources and the source separation matrix; and a step 2306 of separating the signals recorded by the seismic receiver based on the first and second earth impulse responses HA and HB such that signals originating from the first vibratory seismic source are disentangled from signals originating from the second vibratory seismic source.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer-readable medium may be utilized, including hard disks, CD-ROMs, digital versatile discs (DVDs), optical storage devices, or magnetic storage devices such a floppy disk or magnetic tape. Other non-limiting examples of computer-readable media include flash-type memories or other known types of memories.

The above embodiments were discussed without specifying what type of seismic receivers are used to record the seismic data. In this sense, it is know in the art to use, for a marine seismic survey, streamers that are towed one or more vessels and the streamers include the seismic receivers. The streamers may be horizontal or slanted or having a curved profile as illustrated in FIG. 24.

Figure 24:
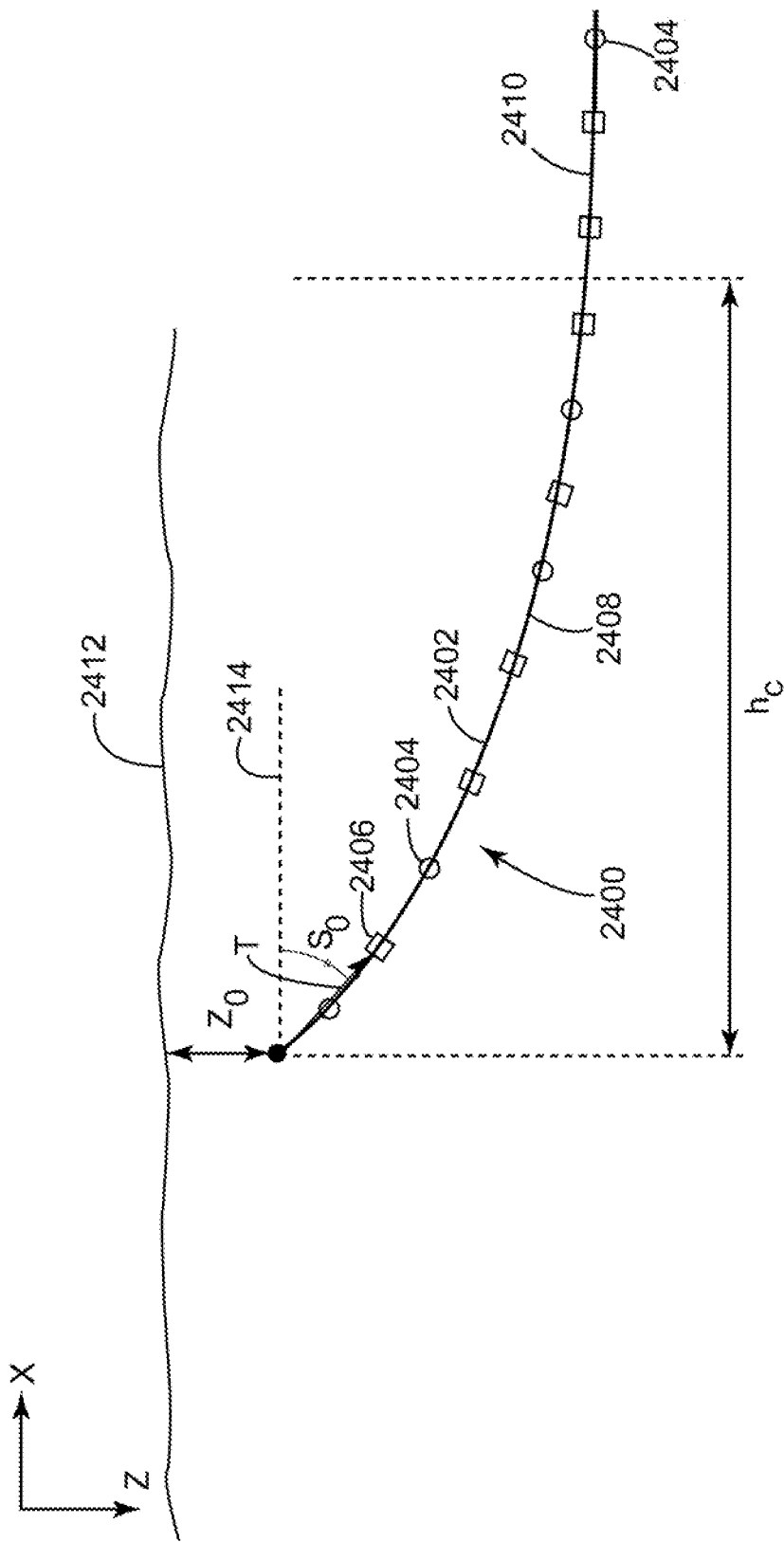
FIG. 24 illustrates a curved profile streamer.

The curved streamer 2400 of FIG. 24 includes a body 2402 having a predetermined length; plural detectors 2404 provided along the body; and plural birds 2406 provided along the body for maintaining the selected curved profile. The streamer is configured to flow underwater when towed such that the plural detectors are distributed along the curved profile. The curved profile may be described by a parameterized curve, e.g., a curve described by (i) a depth $z_0$ of a first detector (measured from the water surface 2412), (ii) a slope $s_0$ of a first portion T of the body with an axis 2414 parallel with the water surface 2412, and (iii) a predetermined horizontal distance $h_c$ between the first detector and an end of the curved profile. It is noted that not the entire streamer has to have the curved profile. In other words, the curved profile should not be construed to always apply to the entire length of the streamer. While this situation is possible, the curved profile may be applied only to a portion 2408 of the streamer. In other words, the streamer may have (i) only a portion 2408 having the curved profile or (ii) a portion 2408 having the curved profile and a portion 2410 having a flat profile, the two portions being attached to each other.

The disclosed exemplary embodiments provide computer software, a processing device and a method for generating driving signals for marine vibrational sources. It should be understood that this description is not intended to limit the invention. On the contrary, the exemplary embodiments are intended to cover alternatives, modifications, and equivalents, which are included in the spirit and scope of the invention as defined by the appended claims. Further, in the detailed description of the exemplary embodiments, numerous specific details are set forth to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for separating signals recorded by a seismic receiver and generated with at least first and second vibratory seismic sources, the method comprising:
   receiving seismic data that includes data d recorded by the seismic receiver and data related to the first and second vibratory seismic sources, wherein the first and second vibratory sources are driven simultaneously and continuously with no listening time;
   computing in a computing device a source separation matrix based on the data related to the first and second vibratory seismic sources;
   calculating first and second earth impulse responses HA and HB corresponding to the first and second vibratory seismic sources, respectively, based on the data d recorded by the seismic receiver, the data related to the first and second vibratory seismic sources and the source separation matrix; and
   separating the signals recorded by the seismic receiver based on the first and second earth impulse responses HA and HB such that signals originating from the first vibratory seismic source are disentangled from signals originating from the second vibratory seismic source.

2. The method of claim 1, further comprising:
   parsing the data d recorded by the seismic receiver into smaller-length data segments; and
   calculating the first and second earth impulse responses HA and HB based on the smaller-length data segments, wherein a length of the smaller-length data segments is equal to a pre-determined length of pseudorandom sequences that drive the first and second vibratory seismic sources.

3. The method of claim 1, wherein the data related to the first and second vibratory seismic sources includes (i) first and second measured outputs U and V of the first and second vibratory seismic sources, respectively, and (ii) excitation signals A and B that drive the first and second vibratory seismic sources, respectively.

4. The method of claim 3, further comprising:
   cross-correlating the first and second measured outputs U and V with the excitation signals A and B; and
   windowing with a first window function results of the cross-correlating step to form matrix vectors RUA, RUB, RVA, and RVB.

5. The method of claim 4, further comprising:
   applying a Fourier transform to the matrix vectors RUA, RUB, RVA, and RVB.

6. The method of claim 5, wherein the source separation matrix is given by $\{D_f(S_f)^T\}$, where $$S_f := \begin{pmatrix} FRUA_f & FRVA_f \\ FRUB_f & FRVB_f \end{pmatrix}, D_f := [(\overline{S_f})^T \cdot S_f + \gamma \cdot I]^{-1},$$

I is the identity matrix, f is frequency index, $\gamma$ is a constant, $FRUA_f$, $FRUB_f$, $FRVA_f$ and $FRVB_f$ are the frequency domain elements of the Fourier transformed time domain matrix vectors rUA, rUB, rVA, rVB, and T is the matrix transpose operator.

7. The method of claim 5, further comprising:
   cross-correlating the data d recorded by the seismic receiver with the excitation signals A and B.

8. The method of claim 7, further comprising:
   windowing with a second window function results of the step of cross-correlating the data d recorded by the seismic receiver with the excitation signals A and B; and
   applying a Fourier transform to results of the windowing step to obtain the Fourier transforms FRHA and FRHB of the windowed cross-correlations results.

9. The method of claim 8, further comprising:
   forming a matrix vector R that includes the Fourier transforms FRHA and FRHB.

10. The method of claim 9, further comprising:
    calculating an earth impulse response matrix H based on the source separation matrix and the matrix vector R, wherein the earth impulse response matrix H includes the earth impulse response HA of the first vibratory seismic source and the earth impulse response HB for the second vibratory seismic source.

11. The method of claim 10, where the earth impulse response matrix H is the product of the source separation matrix and the matrix vector R.

12. The method of claim 1, wherein the first vibratory seismic source is a low frequency source and the second vibratory seismic source is a high frequency source.

13. A computing device for separating signals recorded by a seismic receiver and generated with at least first and second vibratory seismic sources, the computing device comprising:
an interface for receiving seismic data that includes data d recorded by the seismic receiver and data related to the first and second vibratory seismic sources, wherein the first and second vibratory sources are driven simultaneously and continuously with no listening time; and
a processing unit connected to the interface and configured to,
compute a source separation matrix based on the data related to the first and second vibratory seismic sources;
calculate first and second earth impulse responses HA and HB corresponding to the first and second vibratory seismic sources, respectively, based on the data d recorded by the seismic receiver, the data related to the first and second vibratory seismic sources and the source separation matrix; and
separate the signals recorded by the seismic receiver based on the first and second earth impulse responses HA and HB such that signals originating from the first vibratory seismic source are disentangled from signals originating from the second vibratory seismic source.

14. The computing device of claim 13, further comprising:
parsing the data d recorded by the seismic receiver into smaller-length data segments; and
calculating the first and second earth impulse responses HA and HB based on the smaller-length data segments,
wherein a length of the smaller-length data segments is equal to a pre-determined length of pseudorandom sequences that drive the first and second vibratory seismic sources.

15. The computing device of claim 13, wherein the data related to the first and second vibratory seismic sources includes (i) first and second measured outputs U and V of the first and second vibratory seismic sources, respectively, and (ii) excitation signals A and B that drive the first and second vibratory seismic sources, respectively.

16. The computing device of claim 15, wherein the processor is further configured to:
cross-correlate the first and second measured outputs U and V with the excitation signals A and B; and
window with a first window function results of the cross-correlating step to form matrix vectors RUA, RUB, RVA, and RVB.

17. The computing device of claim 16, wherein the processor is further configured to:
apply a Fourier transform to the matrix vectors RUA, RUB, RVA, and RVB.

18. The computing device of claim 17, wherein the source separation matrix is given by $\{D_f(\overline{S_f})^T\}$, where $$S_f := \begin{pmatrix} FRUA_f & FRVA_f \\ FRUB_f & FRVB_f \end{pmatrix}, D_f := \left[(\overline{S_f})^T \cdot S_f + \gamma \cdot I\right]^{-1},$$

I is the identity matrix, f is frequency index, $\gamma$ is a constant, $FRUA_f$, $FRUB_f$, $FRVA_f$, and $FRVB_f$ are the frequency domain elements of the Fourier transformed time domain matrix vectors rUA, rUB, rVA, rVB, and T is the matrix transpose operator.

19. The computing device of claim 17, wherein the processor is further configured to:
cross-correlate the data d recorded by the seismic receiver with the excitation signals A and B;
window with a second window function results of the step of cross-correlating the data d recorded by the seismic receiver with the excitation signals A and B;
apply a Fourier transform to results of the windowing step to obtain the Fourier transforms FRHA and FRHB of the windowed cross-correlations results;
form a matrix vector R that includes the Fourier transforms FRHA and FRHB; and
calculate an earth impulse response matrix H based on the source separation matrix and the matrix vector R, wherein the earth impulse response matrix H includes the earth impulse response HA of the first vibratory seismic source and the earth impulse response HB for the second vibratory seismic source;
wherein the earth impulse response matrix H is the product of the source separation matrix and the matrix vector R.

20. A non-transitory computer readable medium including computer executable instructions, wherein the instructions, when executed by a processor, implement a method for separating signals recorded by a seismic receiver and generated with at least first and second vibratory seismic sources, the instructions comprising:
receiving seismic data that includes data d recorded by the seismic receiver and data related to the first and second vibratory seismic sources, wherein the first and second vibratory sources are driven simultaneously and continuously with no listening time;
computing in a computing device a source separation matrix based on the data related to the first and second vibratory seismic sources;
calculating first and second earth impulse responses HA and HB corresponding to the first and second vibratory seismic sources, respectively, based on the data d recorded by the seismic receiver, the data related to the first and second vibratory seismic sources and the source separation matrix; and
separating the signals recorded by the seismic receiver based on the first and second earth impulse responses HA and HB such that signals originating from the first vibratory seismic source are disentangled from signals originating from the second vibratory seismic source.

* * * * *

UNITED STATES PATENT AND TRADEMARK OFFICE
CERTIFICATE OF CORRECTION

| | | |
|---|---|---|
| PATENT NO. | : 8,724,428 B1 | |
| APPLICATION NO. | : 13/677713 | |
| DATED | : May 13, 2014 | |
| INVENTOR(S) | : Sallas | |

It is certified that error appears in the above-identified patent and that said Letters Patent is hereby corrected as shown below:

In the specification

In Column 5, Line 63, delete "is" and insert -- are --, therefor.

In Column 6, Line 32, delete "if" and insert -- is --, therefor.

In Column 9, Line 1, delete "ND" and insert -- A/D --, therefor.

In Column 17, Line 11, delete "then" and insert -- than --, therefor.

In Column 18, Line 12, delete "LHV" and insert -- LFV --, therefor.

In Column 23, Line 56, delete "LHV" and insert -- LFV --, therefor.

In Column 23, Line 57, delete "LHV" and insert -- LFV --, therefor.

Signed and Sealed this
First Day of December, 2015

Michelle K. Lee
*Director of the United States Patent and Trademark Office*